(12) United States Patent
Burwell et al.

(10) Patent No.: US 10,744,736 B2
(45) Date of Patent: Aug. 18, 2020

(54) GRAPHITE COMPOSITES AND THERMAL MANAGEMENT SYSTEMS

(71) Applicant: GrafTech International Holdings Inc., Brooklyn Heights, OH (US)

(72) Inventors: Deanna J. Burwell, Strongsville, OH (US); Helen K. Mayer, Parma, OH (US); Martin D. Smalc, Parma, OH (US); Lawrence K. Jones, Parma, OH (US); Gerald F. Hoffert, Euclid, OH (US); Mark A. Sullivan, Richfield, OH (US); Andrew D. Wild, Crystal Lake, IL (US); Craig A. Butrick, Mentor on the Lake, OH (US)

(73) Assignee: NeoGraf Solutions, LLC, Lakewood, OH (US)

( * ) Notice: Subject to any disclaimer, the term of this patent is extended or adjusted under 35 U.S.C. 154(b) by 321 days.

(21) Appl. No.: 15/735,428

(22) PCT Filed: Jun. 10, 2016

(86) PCT No.: PCT/US2016/037075
§ 371 (c)(1),
(2) Date: Dec. 11, 2017

(87) PCT Pub. No.: WO2016/201363
PCT Pub. Date: Dec. 15, 2016

(65) Prior Publication Data
US 2018/0169994 A1    Jun. 21, 2018

Related U.S. Application Data

(60) Provisional application No. 62/174,727, filed on Jun. 12, 2015, provisional application No. 62/211,985,
(Continued)

(51) Int. Cl.
*B32B 3/26* (2006.01)
*B32B 5/02* (2006.01)
(Continued)

(52) U.S. Cl.
CPC .............. *B32B 3/266* (2013.01); *A41D 1/002* (2013.01); *A41D 27/02* (2013.01); *B32B 5/024* (2013.01);
(Continued)

(58) Field of Classification Search
CPC ....................................................... B32B 3/266
(Continued)

(56) References Cited

U.S. PATENT DOCUMENTS

| | | |
|---|---|---|
| 3,404,061 A | 10/1968 | Shane |
| 3,627,551 A | 12/1971 | Olstowki |

(Continued)

FOREIGN PATENT DOCUMENTS

| | | |
|---|---|---|
| CN | 101512677 | 8/2009 |
| CN | 104029461 | 9/2014 |

(Continued)

OTHER PUBLICATIONS

Extended European Search Report from EP Application No. 16808470.5 from corresponding International Application No. PCT/US2016/037075, dated Jan. 22, 2019.
(Continued)

*Primary Examiner* — Lori L Baker
(74) *Attorney, Agent, or Firm* — Calfee, Halter & Griswold LLP

(57) ABSTRACT

A composite article is provided for use as a heat spreader, a cooling element or as part of the heating system for a wide variety of items. The composite article can include at least one sheet of compressed particles of exfoliated graphite or graphitized polymer. A protective coating may be aligned or
(Continued)

adhered with a surface of the sheet. The article may also include at least on of a fiber reinforced polymer, a fiber weave or fiber mat or combinations thereof, aligned with at least one of the first surface of the sheet or a second surface of the sheet. The composite article can include a plurality of strips of compressed particles of exfoliated graphite, of graphitized polymer or combinations thereof, which are woven together and/or it can include cut outs, slits or other perforations to provide flexibility, stretchability, and breathability.

20 Claims, 16 Drawing Sheets

Related U.S. Application Data filed on Aug. 31, 2015, provisional application No. 62/309,868, filed on Mar. 17, 2016.

(51) Int. Cl.
| B32B 5/06 | (2006.01) |
| B32B 7/12 | (2006.01) |
| B32B 9/00 | (2006.01) |
| B32B 9/04 | (2006.01) |
| F16L 59/02 | (2006.01) |
| A41D 1/00 | (2018.01) |
| A41D 27/02 | (2006.01) |

(52) U.S. Cl.
CPC .......... B32B 5/06 (2013.01); B32B 7/12 (2013.01); B32B 9/007 (2013.01); B32B 9/045 (2013.01); B32B 9/047 (2013.01); F16L 59/029 (2013.01); B32B 2255/02 (2013.01); B32B 2255/26 (2013.01); B32B 2260/021 (2013.01); B32B 2260/023 (2013.01); B32B 2260/046 (2013.01); B32B 2307/30 (2013.01); B32B 2437/00 (2013.01); B32B 2535/00 (2013.01); B32B 2571/00 (2013.01); B32B 2601/00 (2013.01); B32B 2605/003 (2013.01); B32B 2605/08 (2013.01)

(58) Field of Classification Search
USPC .................................. 219/211; 524/495–496
See application file for complete search history.

(56) References Cited

U.S. PATENT DOCUMENTS

| 3,991,248 A | 11/1976 | Bauer |
| 4,878,152 A | 10/1989 | Sauzade |
| 5,100,737 A | 3/1992 | Colombier |
| 5,780,820 A | 7/1998 | Komyoji |
| 6,027,807 A | 2/2000 | Inoue et al. |
| 6,139,942 A | 10/2000 | Hartness |
| 6,280,663 B1 | 8/2001 | Shao |
| 6,395,220 B1 | 5/2002 | Lewis |
| 6,440,563 B2 | 8/2002 | Shao |
| 6,803,108 B2 | 10/2004 | Lewis |
| 6,887,412 B1 | 5/2005 | Ono |
| 7,005,573 B2 | 2/2006 | Lionetta |
| 7,089,995 B2 | 8/2006 | Koscheyev |
| 7,105,108 B2 | 9/2006 | Kaschak |
| 7,172,785 B2 | 2/2007 | Thompson |
| 7,323,214 B2 | 1/2008 | Wakayama |
| 7,425,604 B2 | 9/2008 | Cosman |
| 7,561,114 B2 | 7/2009 | Maezawa |
| 7,790,285 B2 | 9/2010 | Zhamu |
| 7,799,428 B2 | 9/2010 | Fujiwara |
| 8,106,128 B2 | 1/2012 | Cosman |
| 8,119,191 B2 | 2/2012 | Bunyan |
| 8,501,318 B2 | 8/2013 | Jang |
| 8,501,858 B2 | 8/2013 | Drzal |
| 8,541,976 B2 | 9/2013 | Arai |
| 8,696,938 B2 | 4/2014 | Zhamu |
| 8,766,108 B2 | 7/2014 | Bunyan |
| 8,878,393 B2 | 7/2014 | Bunyan |
| 8,847,184 B2 | 9/2014 | Cheng |
| 8,957,549 B2 | 2/2015 | Kesler |
| 9,017,570 B2 | 4/2015 | Kwak |
| 9,112,364 B2 | 8/2015 | Partovi |
| 9,178,369 B2 | 11/2015 | Partovl |
| 9,852,844 B2 | 12/2017 | Goiko |
| 2003/0044614 A1 | 3/2003 | Morley |
| 2004/0241397 A1 | 12/2004 | Klug et al. |
| 2007/0012900 A1 | 1/2007 | Callen |
| 2007/0252771 A1 | 11/2007 | Maezawa |
| 2009/0107972 A1 | 4/2009 | Naylor |
| 2011/0053052 A1 | 3/2011 | Braun |
| 2011/0135884 A1 | 6/2011 | Lettow |
| 2012/0112553 A1 | 5/2012 | Stoner |
| 2012/0133072 A1 | 5/2012 | Bunyan |
| 2012/0236528 A1 | 9/2012 | Le |
| 2013/0038280 A1 | 2/2013 | Boundy |
| 2013/0200296 A1 | 8/2013 | Song |
| 2013/0207005 A1 | 8/2013 | Cheng |
| 2013/0213630 A1 | 8/2013 | Southard, II |
| 2013/0224023 A1 | 8/2013 | Kim |
| 2013/0265722 A1 | 10/2013 | Hill |
| 2013/0299732 A1 | 11/2013 | Kwak |
| 2013/0309396 A1 | 11/2013 | Legare |
| 2014/0002017 A1 | 1/2014 | Kim |
| 2014/0077758 A1 | 3/2014 | Kaushik |
| 2014/0124906 A1 | 5/2014 | Park |
| 2014/0124907 A1 | 5/2014 | Park |
| 2014/0146477 A1 | 5/2014 | Youn |
| 2014/0182924 A1 | 7/2014 | Misra |
| 2014/0238736 A1 | 8/2014 | Youm |
| 2015/0123860 A1 | 5/2015 | Park |
| 2016/0297383 A1 | 10/2016 | Pike |
| 2017/0354190 A1 | 12/2017 | Cauchy |

FOREIGN PATENT DOCUMENTS

| JP | 1150314 | 2/1999 |
| JP | 3184484 | 7/2001 |
| JP | 2003092384 | 3/2003 |
| JP | 2005229100 | 8/2005 |
| KR | 136704 | 12/2008 |
| KR | 10-1287574 | 7/2013 |
| WO | 2006125045 | 11/2006 |
| WO | 2007123645 | 3/2007 |
| WO | 2009158045 | 12/2009 |
| WO | 2013105757 | 7/2013 |
| WO | 2013138265 | 9/2013 |
| WO | 2013164818 | 11/2013 |
| WO | 2014061048 | 11/2013 |
| WO | 2014186452 | 11/2014 |
| WO | 2015148498 | 11/2014 |
| WO | 2016/077843 | 5/2016 |
| WO | 2016077843 | 5/2016 |

OTHER PUBLICATIONS

Chugh, R. "Flexible Graphite as a Heating Element", Composite Materials Research Laboratory, University of Buffalo, The State University of New York, Buffalo, Carbon, 40, 2002, 2285-2289.
Luo, X, et al. "Electronic Applications of Flexible Graphite", Journal of Electronic Materials, vol. 31, No. 5 2002.
Gaier, J.R., et al. "Emit Shields Made from Intercalated Graphite Composites" NASA Technical Memorandum 10979, Seventh International Materials and Processing Center Society for Acvancement of Materials Processing Parsippany, NJ, Jun. 21-23, 1994.

GRAPHITE COMPOSITES AND THERMAL MANAGEMENT SYSTEMS

TECHNICAL FIELD

The disclosure relates to the use of graphite for making a composite and in particular flexible graphite. The composite has application in a thermal management system, and in particular instances to a thermal management arrangement including a flexible graphite composite that is flexible, stretchable and/or will conform to movement incurred during use. Non-limiting examples of articles of manufacture which the system may be incorporated into include articles of clothing such as garments, seats such as car seats or other applications which the application of individual climate control is either desirable or beneficial to user.

BACKGROUND

Resistively heated jackets have been offered by DeWalt, Ravean, Milwaukee, EXO² and others According to DeWalt their line of jackets may be powered by 20V MAX or 12V MAX lithium ion batteries Which each jacket includes, additionally the jacket may include an LED controller with three temperature settings plus a pre-heat mode, and three or four heating zones (depending on model). The outer shells are reported to be built with durable fabrics that arc wind and water resistant (depending on model), included with every jacket is a USB power source that not only transfers the heating power from the battery to the jacket but can also charge up to two USB-compatible electronic devices at the same time. As for DeWalt and Milwaukee, both of their jackets are wire resistive heating systems to generate heat in distinct locations of each jacket.

EXO² offers a line of heatable clothing from gloves to jackets. The items of clothing are resistively heated using their Fabroc™ heat technology. As shown in FIG. 1 the Fabroc technology is used to resistively heat a jacket 1 (shown without sleeves) through the use of a heating element 2 formed of a rubber interlayer 4 having a carbon particle loaded matrix disposed between layers of fabric 6 which form the garment. A power source 8, such as a battery, is electrically connected to the heating element 2, which then generates heat to warm the jacket 1.

BRIEF DESCRIPTION

One embodiment disclosed herein includes a composite article. The article includes at least one sheet of compressed particles of exfoliated graphite or graphitized polymer. A protective coating may be aligned with a first surface of the sheet. The article may also include reinforcement such as at least one of a fiber reinforced polymer, a fiber weave, a synthetic polymer or fiber mat or combinations thereof, aligned with at least one of the first surface of the sheet or a second surface of the sheet.

A second composite article includes a sheet of compressed particles of exfoliated graphite or graphitized polymer. The sheet may be reinforced with at least one of a fiber-reinforced polymer, a synthetic polymer, a fiber weave, fiber mat or combinations thereof. The reinforcement is aliened with either a first major surface or a second major surface of the sheet.

A third embodiment, disclosed herein includes a composite article having at least one of a plurality of strips of compressed particles of exfoliated graphite, of graphitized polymer or combinations thereof, woven together. Each strip may be reinforced by one of a fiber-reinforced polymer, fiber weave, a synthetic polymer or fiber mat. The reinforcement may be aligned with a first surface or second surface of the strip. Optionally, a protective coating may be aligned with the second surface of each strip.

It is to be understood that both the foregoing general description and the following detailed description provide embodiments of the disclosure and are intended to provide art overview or framework of understanding to nature and character of the invention as it is claimed.

BRIEF DESCRIPTION OF THE DRAWINGS

FIG. 1a is a drawing illustrating the composite article coupled to individual panels of a mock-up of a liner for a heatable jacket;

FIG. 1b is a sectional view taken along 1b in FIG. 1a.

FIG. 7a illustrates a rear view of a heated jacket having composite article heating assemblies;

FIG. 7b is a sectional view of the heated jacket taken along 7b in FIG. 7a;

FIG. 8b is a sectional view of the heating assembly taken along 8b in FIG. 8a;

FIG. 8c is a sectional view of the heating assembly of FIG. 8a;

FIG. 9b is a sectional view of the heating assembly taken along fib in FIG. 9a;

FIG. 9c is a sectional view of the heating assembly of FIG. 9a;

FIG. 10b is a sectional view of the heating assembly taken along 10b is FIG. 10a;

FIG. 10c is a sectional view of the heating assembly of FIG. 10a;

DETAILED DESCRIPTION OF EMBODIMENTS

Figures 1A, 1B:
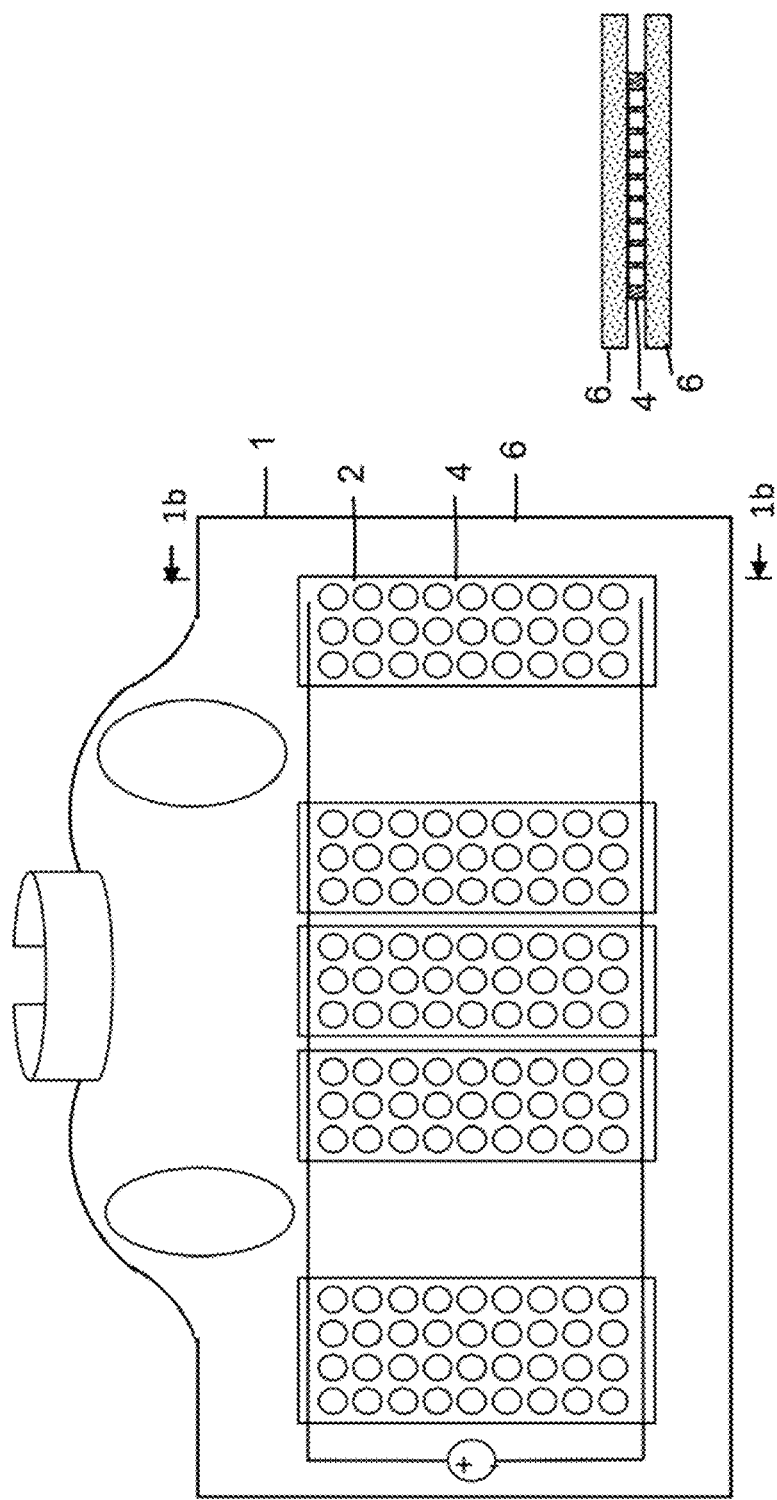

One embodiment disclosed herein is a composite article. The article may include at least one of a sheet of compressed particles of exfoliated graphite or a sheet of graphitized polymer. The article may also include a reinforcement including at least one of a fiber reinforced polymer, a synthetic fabric, a fiber weave, a fiber mat or combinations thereof. Nylon is a specific, non-limiting, example of a reinforcement. The reinforcement may be aligned with one of a first surface of the sheet or a second surface of the sheet. The first surface or the second surface of the sheet is a major surface of the sheet and not an edge surface of the sheet. Optionally the reinforcement may be adhered to the first surface or the second surface. A further optional element is that the article may include a protective coating. The protective coating may be aligned with one of the first surface or the second surface of the sheet. If the protective coating is aligned with the same surface of the sheet as the reinforcement, in one embodiment, the reinforcement is adjacent the sheet and the protective coating is adjacent the reinforcement. If so desired the reinforcement and/or the protective coating may cover at least substantially all of a major surface of the sheet as well as one or more edge surfaces of the sheet. Examples of the protective coating include plastics, such as but not limited to, polyethylene terephthalate (PET), polyimides or other suitable plastics. The protective coating may provide the benefit of electrically isolating the graphite sheet from another component. If so desired, the protective coating may solely include perforations.

In an alternate embodiment, the protective coating (aka layer) may be on an opposite surface of the sheet than the reinforcement. For example if the reinforcement is aligned with the first surface of the sheet, the protective coating may be aligned with the second surface of the sheet. Optionally, the protective coating may be adhered to the second surface. A particular further embodiment, includes a second protective coating located adjacent the reinforcement and opposite to the sheet.

Similar to how the protective coating may be on both exterior surfaces of the article, likewise the reinforcement layer may be on both sides of the graphite sheet. In this embodiment, the protective coating may be located on, one or both of the graphite surfaces.

In another example, the composite article can also include a thermal interface material (TIM) disposed in adjacent alignment with a heating element and in adjacent alignment with the reinforcement or the graphite sheet. In one example, the TIM may be a flexible graphite material, such as a sheet of compressed particles of exfoliated graphite or a sheet of graphitized polymer. In one example, the TIM may be eGRAF® HITHERM™ thermal interface material sold by GrafTech International Holdings Inc. which is designed for use in applications requiring low contact resistance and high thermal conductivity. The flexible graphite forming the TIM can be die-cut and/or laminated with plastics and adhesives disposed on one or both major surfaces of the TIM. In one non-limiting example, a layer of adhesive-plastic-adhesive (APA) material may be disposed in adjacent alignment with the TIM material. The APA material can include a plastic, such as for example polyethylene terephthalate (PET), such as Mylar® polyethylene terephthalate from DuPont, Kapton® polyimide from DuPont, polyester resin or other suitable plastics which can be used to provide electrical isolation between the TIM and the heating element, having adhesive on both major surfaces of the APA material. The APA material can be disposed in adjacent alignment with the graphite sheet discussed above. In a particular embodiment, the APA material, if optionally desired even the TIM material, are larger in surface area than the surface area defined by the outer perimeter of the heating element, having surface areas at least 5% greater than the surface area of the heating element, and more preferably having surface areas at least 10% greater. Stated otherwise, the APA material may be sized to minimize the possibility of the heater element extending around or beyond the APA material such that it is likely that it would come in contact with a sufficient electrically conductive material to cause a short circuit of the heating element. In one example, the APA material is not used and the TIM material is disposed in adjacent alignment with the heater element and the graphite sheet discussed above.

In a further embodiment, the article may include a second graphite sheet. The second graphite sheet may be either a sheet of compressed particles of exfoliated graphite or a sheet of graphitized polymer. Preferably, in this embodiment the reinforcement is located between the sheet and the second graphite sheet. The embodiment may also include the protective coating on the exterior surface of the sheet, the second graphite sheet or both.

The article may also include stitching through at least a majority of the sheet. The stitching may be just through the graphite, all of the sheets/layers, which make up the article, or any combination thereof. Examples of suitable stitching include at least one of a cross hatching stitch, chain stitch, lock stitch, straight stitch, zigzag stitch, stretch stitch, overlook stitch, cover stitch, running stitch, back stitch, satin stitch, outline stitch, double stitch, back tack stitch, basting stitch, blanket stitch, blind stitch, buttonhole stitch, chain stitch, cross-stitch, catch stitch, cross-stitch tack, darning stitch, embroidery stitch, hemming stitch, overcast stitch, pad stitch, pie stitch, running stitch, sailmakers stitch, slip stitch, tent stitch, top stitch, whip stitch and combinations thereof.

Another option may be the choice of thread. If so desired conductive thread may be used. Examples of conductive thread include stainless steel, carbon, silver or aluminum.

With or without the stitching, the composite article may include a plurality of cut outs. The cut outs may be any desired shape; exemplary shapes include circular, triangular, oval, rectangular, diamond shaped, elliptical, hexagonal, octagonal, chevron, perforations and combinations thereof. A further option may be that the cut outs are tapered in one direction or the other. Another embodiment of a composite article may include a plurality slits or other predetermined perforations having a variety of shapes including but not limited to those described with reference to the cut outs.

Another embodiment of a composite article may include a plurality of strips of compressed particles of exfoliated graphite, graphitized polymer or combinations thereof, woven together ("woven composite article"). Each strip may have a reinforcement. Preferred reinforcements include at least one of a fiber-reinforced polymer, a fiber weave, synthetic polymer or a fiber mat. The strips with the reinforcement may be located in just one (1) direction of the woven composite article, for example the reinforced strips may be disposed in just, the length direction and not the width direction of the composite article or vice versa. The reinforcement may be aligned with one of a first surface or second surface of the strip. Just like the above composite, this composite may also include a protective coating aligned with the first surface or the second surface of each strip. The above descriptions regarding the relationship between, the sheet and the reinforcement as well as the protective coating and the sheet and further the reinforcement and the protective coating are fully incorporated herein as if rewritten as applied to the woven article. Lastly, the woven composite article and the sheet based composite article may be used in combination if so desired.

Additionally embodiments regarding a second graphite sheet or a second woven sheet as described above is equally applicable to the woven composite article.

The woven article may comprise an open weave, e.g., a woven article having openings. The openings of the open weave may comprises one or more of the following shapes circular, rectangular, diamond shaped, elliptical, triangular, hexagonal, octagonal and chevron. A further option may be that the openings are tapered in one direction or the other.

Just like the above embodiment, the woven composite article may include stitching. The stitching may have anyone of the following patterns: at least one of a cross hatching stitch, a chain stich, a lock stitch, a straight stitch, a zigzag stitch, a stretch stitch, an overlock stitch, a cover stitch, a running stitch, a back stitch, a satin stitch, an outline stitch, a double stitch, a back tack stitch, a back stitch, a basting stitch, a blanket stitch, a blind stitch, a buttonhole stitch, a chain stitch, a cross-stitch, a catch stitch, a cross-stitch tack, a darning stitch, an embroidery stitch, a hemming stitch, an overcast stitch, a pad stitch, a pie stitch, a running stitch, a sailmakers stitch, a slip stitch, a tent stitch, a top stitch, a whip stitch and combinations thereof.

In addition to the above, a surface of the sheet or the strips may have a texture. For example, the surface may be knurled, rippled, folded, or ranched. Another optional embodiment for any the above embodiments of the sheet or the strips may be that far infrared radiation ("FIR") generating material may be incorporated into the sheet or strips. The FIR material may comprise, a ceramic material. In a particular embodiment the FIR material may be sized to micron-sized particles or smaller (e.g., nano-sized) or combinations thereof. An example of FIR material is boronsilicate (e.g., Tourmaline or Seiricite). Optionally, the FIR material fiber may be coated with nylon and the resulting material may be drawn into a fiber and incorporated into sheet or strip as preferred. A third option is Celliant™ fabric, a brand-name synthetic polymer bi-component fiber made from optically active particles embedded into the core. Celliant fabric was created by Hologenix, LLC, Fabrics containing Celliant fabric have been shown to increase oxygenation in body tissue and demonstrated to reduce minor aches and pains. Instead of the FIR material being incorporated into the sheet as an additive, the FIR material may be added to the composite article as a sheet, thereby forming another layer of the composite. Further alternatives include that the FR material may be spray coated onto the surface of the composite or the FIR material may be incorporated into the reinforcement, the protective coating or both.

The composite articles may include one or more of following additional layers: an insulative layer, a reflective layer, a dampening layer (e.g., a rubber layer), an absorbing layer, a cushioning layer, a water resistant layer and combinations thereof. Alternatively, at least for benefits of reflectivity and dampening, such benefits may be enhanced through the use of additives to the composite instead of a separate layer. The particular additive may provide reflectivity, dampening or both.

An additional example of a composite article disclosed herein may be one (1) or more layers of a graphite sheet. The graphite sheet may be a sheet of compressed particles of exfoliated graphite, graphitized polymer or combinations thereof. Adjacent to the Graphite layer may be a polymeric sheet. Examples of suitable polymers for the sheet may include polyimides, polyethylene terephthalate ("PET"), polyester, other polymers which when in sheet form may reflect heat or combinations thereof. The polymeric sheet may be located on one (1) or both major surfaces of the graphite sheet. This embodiment may have applications far active or passive heating.

The afore composite articles may exhibit unique flexibility for a graphite composite article. The composite article exhibits stretchability in a first direction of at least 5%, preferred at least 10%, and even more preferred at least 15% elongation. Elongation may be determined by the application of a tensile force to article in a predetermined direction. The percent elongation is determined by the change in length of the article in the direction of the application of a tensile force prior to rupture divided by the dimension of the article at rest in the direction the three was applied. The composite article may exhibit stretchability in a second direction of less elongation than in the first direction. By way of example, the article may elongate in the first direction by at least 10% and may elongate in the second direction by at least 4%.

In one particular embodiment, the composite article also allows for a maximum bending radius of 35 degrees. Examples of a radius, which the composite article may be bent around, include a radius of ⅛" (3.0 mm) or less. Particular embodiments may be wrapped around a ¼" (0.635 cm) mandrel. Another embodiment of the composite article may be wrapped around a ½" (1.27 cm) mandrel. Another advantageous property of the composite article may be its breathability. Preferably, the cut outs, slits, and/or other predetermined perforations are sized to enhance breathability, even more preferably, but not required, the cut outs, slits, and/or other predetermined perforations are sized to enhance breathability and stretchability. In a version, of this embodiment, both the graphite sheet and the at least one of the reinforcement or protective coating includes the perforations, optionally both of the protective coating and the reinforcement.

The composite articles described herein are not limited to any particular overall shape. The article may have a rectangular shape, a square shape, a circular shape, an oval shape, a triangular shape, a rhombus-shape, or any other desired shape. Typically, the article is substantially two (2) dimensional in that the length and the width of the article are the major components of the shape, and the thickness of the article is much less than either of the length or the width of the article.

Additionally any one of the above composite articles may be in thermal communication with a heating element. The composite article may function as a heat spreader. In particular embodiments, the composite article may include copper leads to connect to a resistive heating element or one or more of the edges of the composite article may be covered with copper tape to connect to a heating element, especially but not limited to a resistive heating element. Alternatively, the composite article may be adhered to the heating element.

In an alternative embodiment, the composite article may comprises a portion of a heating element or the entire heating element. Either in addition to or separate from, the composite articles disclosed herein may be used in a cooling application and not just for spreading heat.

Applications for the above composite articles may include a heat spreader, a cooling element or a part of the heating system for any of the following articles: a jacket, with or without a hood, (jacket as used herein includes coats, parkas, or any other term that may be used to describe an outer garment someone would place over their torso to protect, insulate, or comfort themselves from cold temperatures) (such jacket may or may not be a motorcycle jacket) (optionally the hood if present may or may not be heated), a clothing liner (such liner may or may not be removable), a shirt, a vest, a robe, a vehicle seat, vehicle seat cover, indoor or outdoor seating, furniture covers, stadium seat including benches, portable seating, camping equipment such as but not limited to a sleeping bag, a mattress, medical pads, therapeutic pads, heated therapeutic pads (pads as used in the last three (3) examples includes wraps) (the graphite sheet may be located either on the outside of the heating element (either opposed to the user) or between the heating element and the user; the graphite sheet may include one or more plastic layers is so desired (this description also applies to medical pads)), a pair of pants, a glove, a helmet, a vest, blankets, scarves, hats, undergarments, other human wearables, and animal accessories (e.g., horse blanket, dog mat, other animal wearables) vehicle upholstery, seat backs, vehicle floor panels, vehicle roof panels, steering wheels, vehicle doors, instrument panels, and vehicle dash boards. For wearables, a section of them may be removable, such as a wearable with sleeves, the sleeves may be removable. Such applications may include one or more of the above composite articles. If so desired the composite articles may be used in any combination along with the above application. The herein described articles may be incorporated into seams, zippers, collar, hoods, cuffs or other portions of the above articles.

With respect to vehicles, this technology has a very appealing application in electric or hybrid vehicles. The use of this technology in a conventional non-fossil-fuel based vehicle or hybrid will help support the battery or fuel cell dependent power system. Vehicles which incorporate this technology would use less of its power source far the comfort of the occupant(s) and more for the benefit of generating the desired movement of the vehicle. This will enable such vehicles to be even more fuel-efficient than they currently are. Applications for this technology, may include the upholstery, flooring, roof, dashboard, steering wheel, instrument panel, seating and any combination thereof. Preferably one or more of the thermal management systems mentioned herein with a heating element are disposed in thermal communication with the occupant-facing surface of the application such that the desired heating or cooling is applied to the occupant.

In anyone of the thermal management systems disclosed herein, insulation may be included in the thermal management system. Preferably, the insulation may be located adjacent the composite article, opposed to the heating element. Preferably, the insulation would be adjacent the graphite sheet of the composite article. Any desired type of insulation may be used. Non-limiting examples of suitable types of insulation include: woven glass cloth, ceramic cloth, fiber glass mat, ceramic mat, glass foam, ceramic foam, glass wool, polymer foams, e.g., expanded polystyrene, expanded polypropylene, polyurethane, polyethylene, aerogels, aerogel loaded polymers, polyimide aerogel insulation, carbon fiber cloth, carbon foam, and combinations thereof.

In the case that one of the afore composite articles are included in an application in which the composite article is coupled with a fabric, the following options may be applied to at least one of the fabric or the composite article: (1) draping; (2) chintzing to provide an end embodiment with a shiny finish; (3) polyurethane or vinyl coating; (4) sizings with waxes, oils, glycerin, resins and combinations thereof to add body (aka density) to the final article; (5) metallic salts may be added to provide body to the final article; (6) the addition of softening agents, such as but not limited to silicone compounds, to provide drapability; (7) crosslinking agents, such as but not limited to triazone resins, urons (formed from the reaction of a urea with aldehyde), aklyene ureas or carboxylic acids, to provide wrinkle free finishes and (8) combinations thereof. In the case of the composite article, preferably, the option may be added to either of the sheet or the strip.

If so desired the composite article may be laminated to a fabric and/or material, including but not limited to a polymeric material, through a calendaring process.

The desired composite article may be coupled with a fabric and/or material, in a variety of manners including but not limited to sewing, such as for example using the stitching described herein, by laminating, by adhering, by printing, and/or otherwise co-locating it adjacent thereto.

In view of the various applications, the composite article may cover any desired percentage of the article it is coupled with and/or incorporated into. By way of example in the case of the jacket or a shirt, the article typically includes three (3) panels, a back panel, a right front panel and a left front panel. The composite article may be applied to at least twenty-live (25%) percent of the area of desired panel. The composite panel may also be in thermal communication with heating or cooling elements. Alternatively, the composite article may be part of the heating element. As desired the composite article can be applied up to 100% of the chosen portion of the panel, all percentages between 25% to 100% should be considered disclosed herein. In one particular embodiment, the composite article is in thermal communication with at least fifty (50%) percent of one or more desired panels of the article. In the case, the jacket has a hood, the composite may be incorporated into the hood of the jacket. The same is true for the sleeves of the jacket if so desired. In one particular embodiment up to 100% of the lining of the article of clothing, such as but not limited to a jacket is lined with a plurality of composite articles. The adjacent composite articles may be in thermal communication with each other through stitching adjacent articles together. In a second embodiment, the various adjacent composite articles are adhered together.

In the case of a multi-paneled article, the same composite article may be applied to one (1) or more panels; or separate composite articles may be applied to each panel, or any combination thereof.

As for heated, clothing/garments embodiments, one suitable embodiment includes the exterior shell of the clothing, an insulation, the heat spreader and an inner liner. The heating element may be in thermal communication with the heat spreader. In one embodiment, the heating element is facing the inner liner and the heat spreader is disposed closer to the exterior shell.

Optional components for the thermal management system may include any of the following: (1) the article may include a solar panel section for absorbing energy from the ambient environment and transmitting such energy to the composite article; (1a) alternatively, the solar panel may be used to recharge any batteries the may be used as the heat source for the thermal management system; (2) motion charging element, the thermal management system may include a device such as those provided by AMPY, iMove, nPower Personal Energy Generator or Genneo; (3) the thermal management system may include a thermostat or other controller to allow a user to regulate the temperature exhibited by the thermal management system; (4) the thermal management system may include blue tooth or other wireless technology; (5) the thermal management system may include a thermoelectric cooling device, for example a Peltier device; (6) thermal management system may be self-regulating; (6) proximity charging capabilities; (7) piezoelectric mat which combines ceramic and polymeric materials giving the mat high energy output and flexibility, respectively, (Source Ricoh); (8) a three-dimensional accelerometer, like a Fitbit Tracker from Fitbit Inc., tor other devices to track and monitor the users activity level; (9) one or more sensing components to measure such as but not limited to at least one of hydration level, blood sugar level, other human medical indicators and combinations thereof; and (10) combinations thereof. The afore-mentioned optional components may be removable from the thermal management system. Wireless technology may be integrated with a user's heart monitor or other device to benefit the user.

Another optional element may include a recharging station fir the garment that includes the composite article. The recharging station may be incorporated into a hanger or hook that the garment is disposed upon. In the case of the hanger, the hanger may have charging connections in the sloping portion of the hanger or the hanger may have a proximity charger. The garment will include the corresponding technology to compliment the charging technology in the hanger. This concept can also be applied to a hook for hanging a garment using the same principles as discussed with the hanger, with slight modifications. For example, in the case of the hook, the garment may use a charging connection in the collar of the jacket/garment instead of in the shoulder sections of the garment.

Other embodiments of heat spreaders also include the incorporation of graphite particles into a polymer, such as but not limited to polyurethane or polychloroprene sheet. The use of the graphite particles would: 1) lower the amount of material to include in the composite; 2) increase or positively enhance the thermal generation properties of the composite, 3) reduce the energy, requirements of the composite product (at a specific heat output), and/or 4) impact the longevity of the product. In one particular embodiment, the graphite particles may be up to about ⅛ of the thickness of the polymer material. This concept is not limited by the ratio of the polymer thickness to particle. The afore-mentioned is just one example.

Exemplary embodiments of power systems which may be applicable to the embodiments disclosed herein include power systems with which can discharge at least five (5) watts up to about two hundred (200) watts. Examples of particular embodiments include five (5) to one hundred fifty (150) watts, five (5) to twenty-five (25) watts, ten (10) to twenty (20) watts, twenty-five (25) to one hundred fifty (150) watts, forty (40) to one hundred twenty (120) watts and forty (40) to ninety (90) watts.

The power system may include one or more Li-ion batteries, lead acid batteries, Ni metal hydride batteries, any other types of power sources used in portable devices and combinations thereof. The heating element may include a positive coefficient thermal resistance ("PCTR") heating element, a wire matrix, discrete heating wires, one or more Peltier devices, fine grid of wires, printed flexible circuits on a plastic matrix material, printed carbon ink circuits on, a plastic matrix material, silver trace printed on a polyester matrix, printed heaters, series of discrete carbon patches an infra-red heating element, the heat from the Li-ion battery pack itself from the heat that is generated as the battery pack is discharging electricity and combinations thereof. Various embodiments of the heating element may be printed directly onto one (1) of the protective coating or the graphite heat spreader.

For example in at least the case of the PCTR heating element, the heating element may be printed on one (1) of the protective coating or the graphite sheet if so desired. In an alternate embodiment, the PCTR heating element may be printed on a separate PET or polyimide layer and is located in thermal communication with the spreader.

Benefits of including the composite article in a thermal management system include at least temperature uniformity will improve as compared to those systems that do not include the composite. In the case of a heating application, the average temperature exhibited will increase, the converse is true for a cooling application. The presence of localized, hot spots is eliminated. In conjunction with temperature uniformity, the flexibility will be maintained and breathability will be maintained. In addition to the aforementioned, areas adjacent where the heating element is disposed which include the composite article to at least some extent will also experience a change in temperature. In the case of a heating application, a 3-10% increase in overall temperature was experienced. This occurred while the power supplied was not adjusted upward. It should be noted that breathability may not be a concern of each embodiment disclosed herein.

Figure 2:
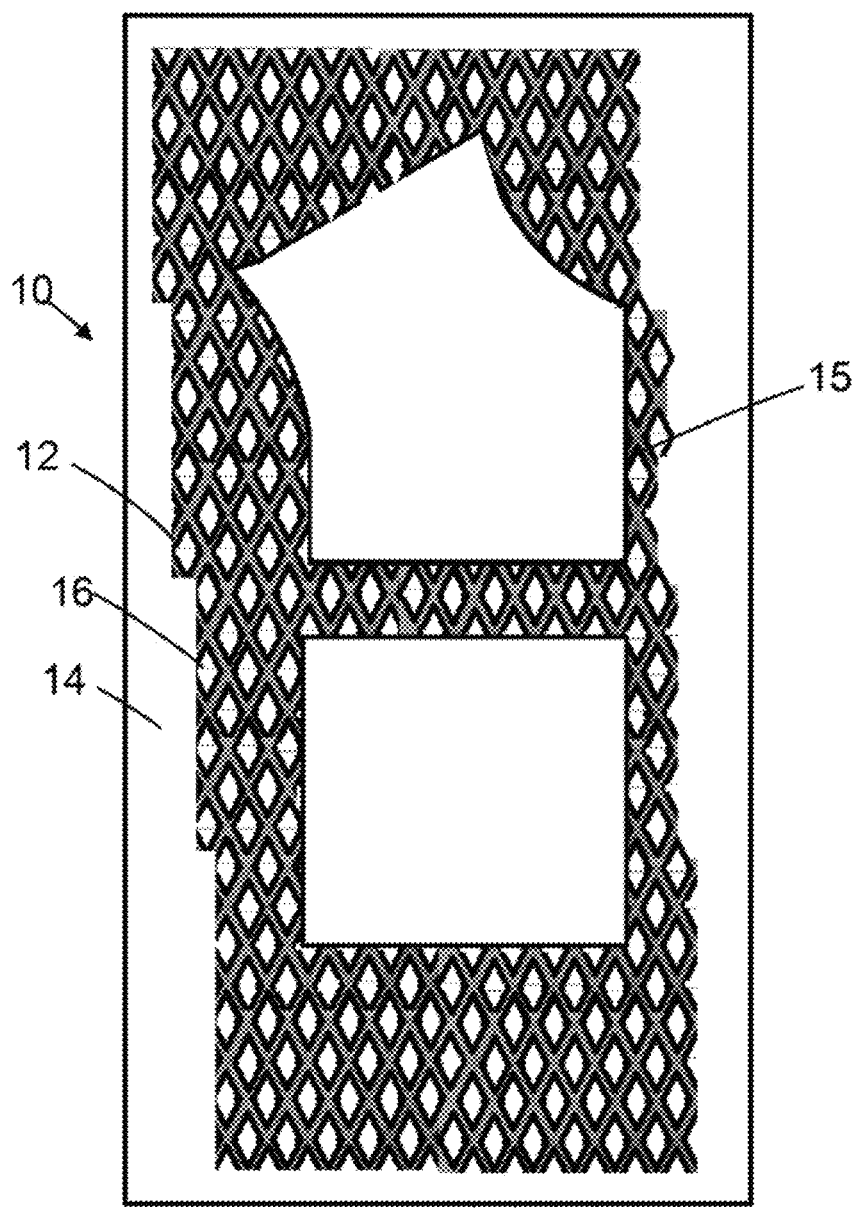
FIG. 2 is a drawing illustrating the composite attic e coupled to individual panels of a mockup of a liner for a heatable jacket.

In FIG. 2, a composite article, referenced generally at 10, includes a graphite sheet 12 as described above stitched to a fabric 14 demonstrating that the article 10 may be sewn to another material. Patterns 15 can be used to construct portions of garments which can be, joined together to make a 3 dimensional heated garment. The sheet 12, as shown, includes a plurality of cut outs 16. The illustrated cut outs 16 are diamond shaped by way of example.

Figure 3A:
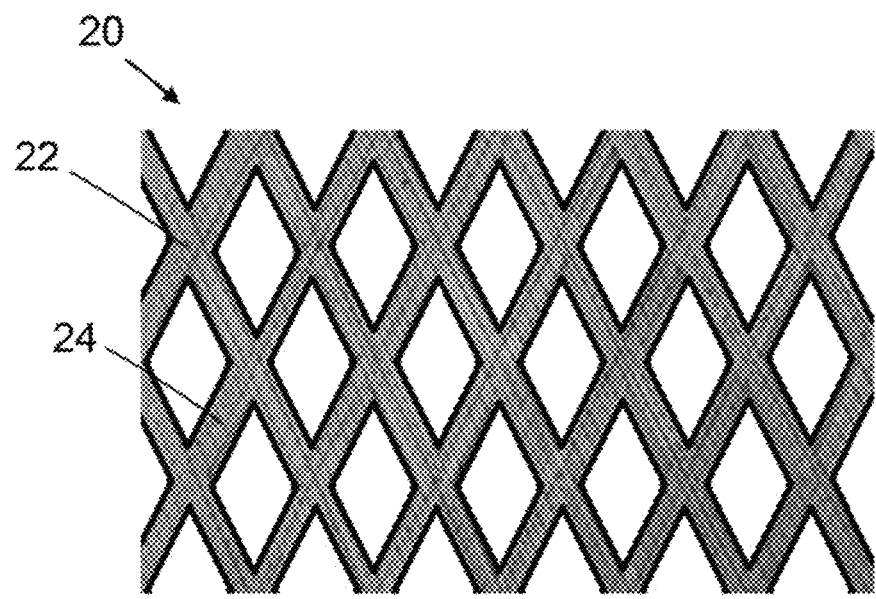
FIG. 3a illustrates an image of the front of an example of the composite article.
Figure 3B:
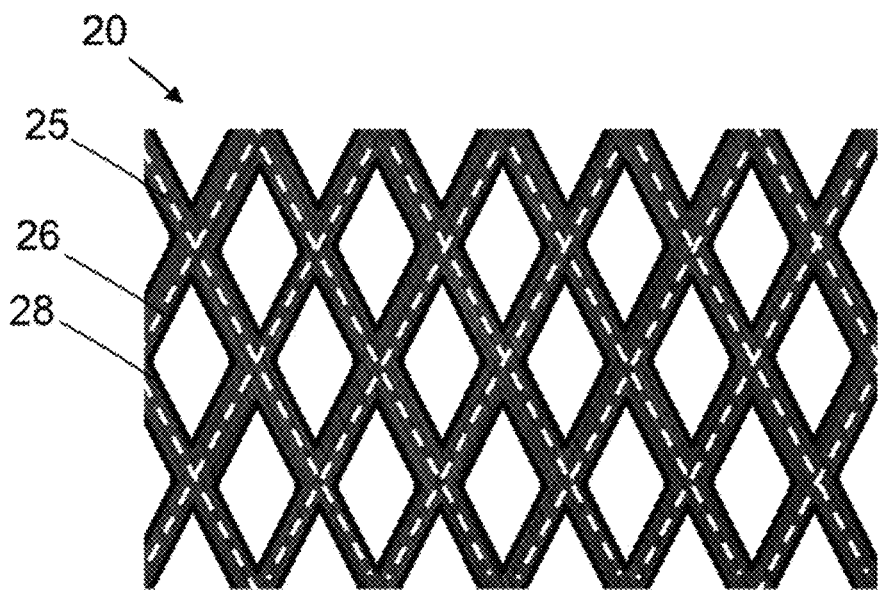
FIG. 3b illustrates an image of the back of an example of the composite article.

Turning to FIGS. 3a and 3b, the first and second sides of another embodiment of the composite article 20 are illustrated. As shown in FIG. 3a, a major surface 22 of the composite article has a reinforcement layer 24 as the outer layer 24. As shown, the reinforcement layer 24 is a fiber reinforced polymer. Major surface 25, shown in FIG. 3b, illustrates a surface of composite article 20 having stitching 26 and a protective coating 28 as an outer surface of article 20. The composite article 20 also includes an internal layer formed of a sheet of compressed particles of exfoliated graphite.

Figure 4:
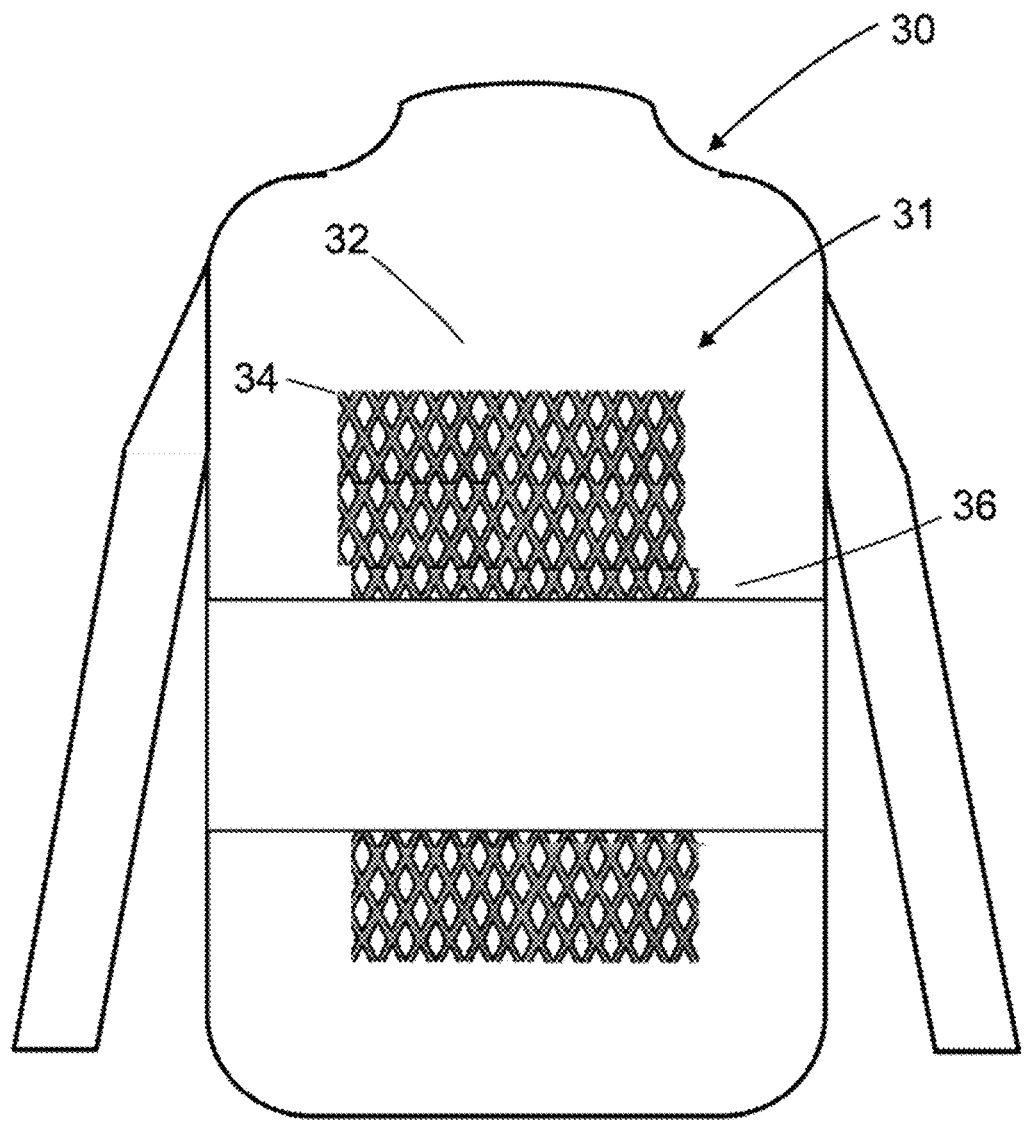
FIG. 4 is a drawing of the composite article incorporated into a jacket.

FIG. 4 is an image of the composite article as shown in FIG. 2 incorporated in thermal communication with the resistive heating element 34 of a heated jacket 30. As shown composite article 31 is disposed adjacent half of the back panel 32 of jacket 30. The resistive heating element 34 spans substantially all of the width of lower portion 36 of back panel 32.

Figure 5:
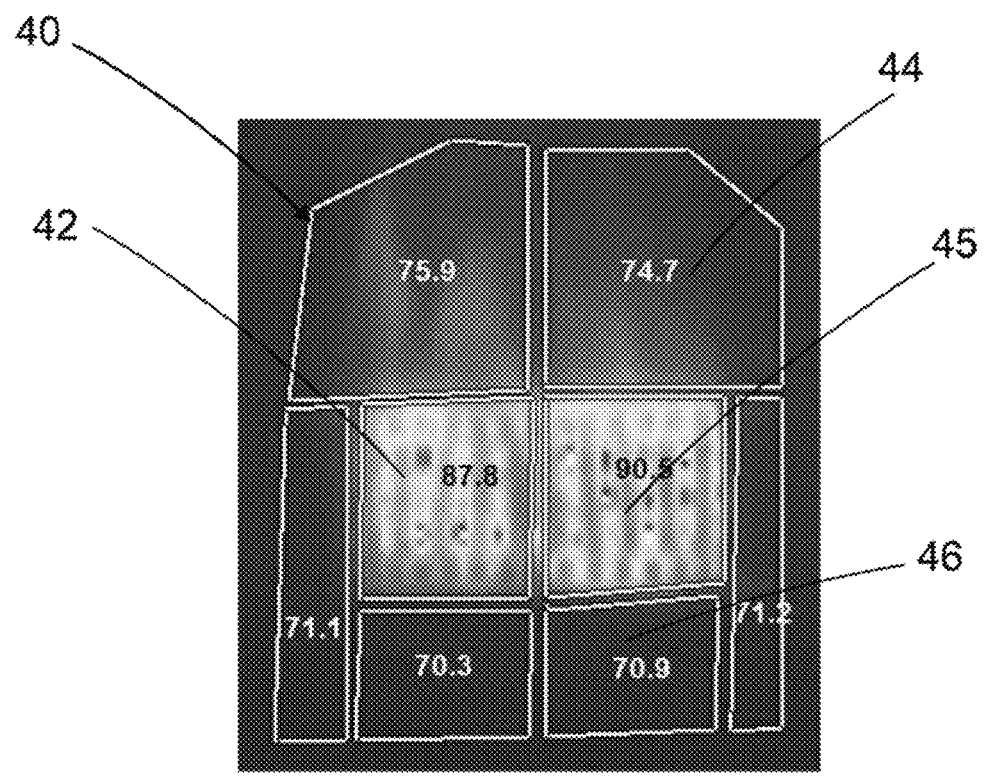
FIG. 5 is a thermal image of a control heated jacket which does not include an embodiment of a composite article described herein.

The jacket 30 was operated and thermal images of the back panel 32 were taken, both without composite article 31 as a control jacket 40 (shown in FIG. 5) and with composite article 31 as jacket 50 (shown in FIG. 6) showing the effects of the embodiment disclosed herein relative to the control. As shown in FIG. 5, the control jacket 40 was operated and thermal image was taken. As illustrated in FIG. 5, the control jacket 40 exhibited various hot spots 42, 45 aligned with resistive heating element 34. Further the temperature differential as exhibited ranges from about 11 to almost 20° F.

Figure 6:
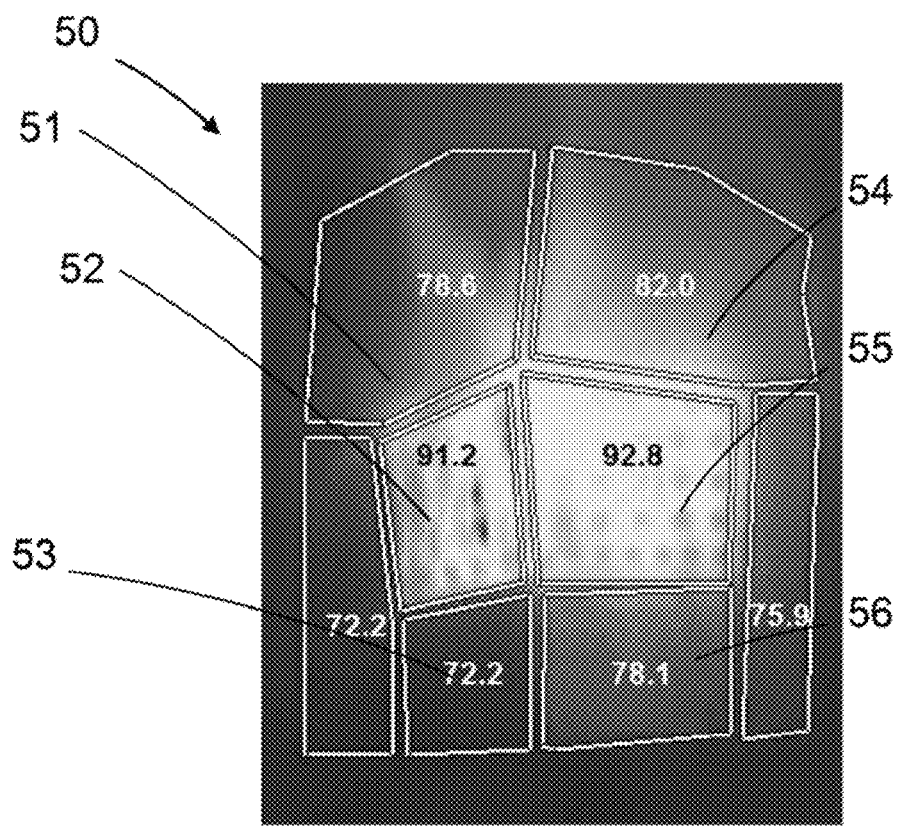
FIG. 6 is a thermal image of a heat jacket which includes an embodiment of a composite article described herein.

Regarding FIG. 6, the composite article spreader was installed on the right hand side of panel 32. Next jacket 50 was operated under normal conditions, (same conditions the jacket was operated in FIG. 4 to the extent possible). The left hand side of the thermal image of panel 32 still exhibited hot spots. The average temperature differential for the three discrete sections 51, 52, and 53 of panel 32 on the left hand side ranges from about 13 to 19° F. As for the right side of panel 32, which included the heat spreader, the temperature differential of panels 54, 55 and 56 was reduced to 11-14° F. The average overall temperature in the portion panel 32 aligned with spreader 34 increased 1.5° F. Also the average temperature of the portion 54 above the heating element 34 and the portion 56 below the heating element 34 increased as compared to similarly situated portions 44 and 46 in the control jacket 40 shown in FIG. 4 and portions 51 and 53 above and below the heating element 34 on the loft hand side of jacket 50 in FIG. 5.

Figures 7A, 7B:
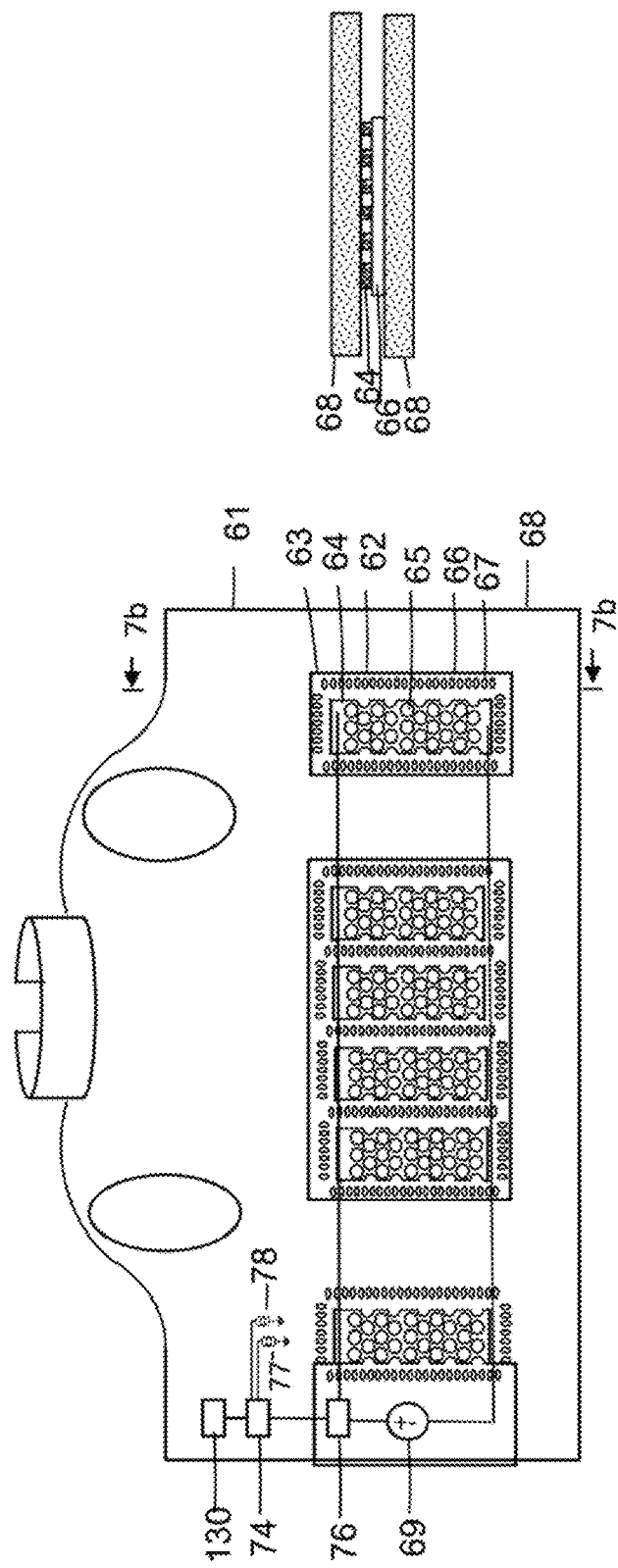

Referring now to FIGS. 7a and 7b, another example of an electrically operated temperature regulated garment, such as a heated garment or a cooled garment is shown generally at 61. In one non-limiting example, the garment can be a heated jacket. The heated jacket 61 includes a plurality of composite articles 62 forming a heating assembly 63 which is used to heat the jacket 61. The composite articles 62 each include a heating element 64. Optionally, the heating elements 64 can be the heating element 2 formed of a rubber interlayer 4 which may or may not be a matrix loaded with carbon particles as discussed above or other particles. The heating elements 64 can include a plurality of cut outs 65. The cut outs 65 may be any desired shape, exemplary shapes include circular, rhombus-shaped rectangular, diamond shaped, elliptical, hexagonal, octagonal, chevron, perforations, triangular, oval, and combinations thereof. By way of example, the cut outs 65 are circular and arranged in a hexagonal close-packed configuration, such that the cut outs 65 in even numbered rows are arranged in a first set of respective columns, and the cut outs 65 in odd numbered rows are arranged in a second set of respective columns, different than the first set. In another example the cut outs are circular and arranged in a cubic close-packed configuration. The composite article 62 also includes graphite 66 disposed in adjacent alignment with the heating element 64. The graphite 66 may be a sheet formed of either compressed particles of exfoliated graphite or of graphitized polymer, as discussed above. The graphite 66 functions as a heat spreader to evenly spread the heat generated by the heating element 64 thereby reducing hot spots as discussed above. The graphite heat spreader is preferably larger in surface area than, the surface area defined by the outer perimeter of the heating element. The graphite heat spreader 66 preferably has a surface area at least 5% greater than the surface area of the heating element, and more preferably it has a surface area at least 10% greater. In an alternative embodiment, the graphite sheet 66 can be the same size as the heating element. In such an embodiment, it is believed that the average temperature will remain the same or increase however uniformity of the temperature profile exhibited will be improved as compared to just the heating element.

The graphite sheet 66 includes a plurality of cut outs 67 as described above. The cut outs 67 may impart flexibility to the graphite sheet for improved use in heated garments 61, The cut outs 67 may also impart breathability to the graphite sheet for improved use in heated garments 61. In the example shown, the cut outs 67 are ellipsoids having respective longitudinal axes, though it should be appreciated that cut outs of shapes having longitudinal axes can be used, non-limiting examples can include diamond-shaped cutouts, ovoid cut-outs or tear drop-shaped cut outs. The cut outs 67 can be arranged to orient the longitudinal axes vertically, with respect to their orientation in the garment 61 when in use. Vertical orientation of the longitudinal axes may improve the vertical stiffness of the graphite 66 reducing the sag of the graphite material when in use in the garment 61. One or more of the cutouts 67 can also be arranged to orient the longitudinal axes horizontally, with respect to their orientation in the garment 61 when in use. Combinations of vertical and horizontal orientations can be used, if so desired. In a particular embodiment, cutouts 67 are elongated and the elongated axis of the cutout is perpendicular to the edge of the heater that such a cutout is facing.

The composite article 62 including the heating element 64 and graphite sheet 66 is disposed between layers of fabric 68 which form the garment 61. One or both, layers of fabric 68 can include insulation, such as for example polyester insulation, suitable for improving the heat retention of the garment 61 A power source 69, such as a battery, is electrically connected to the heating element 64 which then generates heat to warm the jacket 61.

A micro control unit 740 operatively controls, the operation of a switch 76 which connects the power supply 69 to the heating elements 64 and/or cooling devices to regulate the temperature of the garment 61. The switch 76 can include one or more power transistors or other suitable switching elements (not shown) for providing a switchable connection of the power supply 69 to the heating elements 106 and/or cooling devices 108 controlled by the micro control unit 74. In one example, the micro control unit 74 activates the heating elements 64 and/or cooling devices using a switching signal operated at a variable duty cycle. The duty cycle of the switching signal can vary between 0 (representing off) and 100% (representing full on or 100% power). For example, a 50% duty cycle represents 50% power level in that the heating elements 64 and/or cooling devices are connected to the power supply 69 for 50 percent of the time during which the control signal is used.

The garment 61 includes a first temperature sensor 77, also referred to as the exterior temperature sensor, disposed at an exterior location on the garment. The exterior location is adjacent to and outside of the exterior fabric layer of the garment 61. The exterior temperature sensor 77 provides a temperature signal to the micro control unit 74 representing the temperature at the exterior of the garment 100. The garment 100 can also include a second temperature sensor 78, also referred to as the interior temperature sensor, disposed at an interior location on the garment. The interior location is adjacent to and inside of the interior layer, such as an interior fabric layer or liner, of the garment 61. The interior temperature sensor 78 provides a temperature signal to the micro control unit 74 representing the temperature at the interior of the garment 61. The garment 61 includes other sensors including but not limited to a current sensor for sensing the current being supplied by the power supply 69 and a voltage sensor for sensing the voltage of the power supply. The micro control unit 74 uses the current sensor and/or the voltage sensor to determine battery life and generate a signal representing such. The battery life signal can be a percentage left of full battery life, such as for example 78% and/or the battery life signal can be a time increment in hours and/or minutes representing how long the battery will last under present load conditions.

The garment 61 also includes a wireless communication unit 79 for communicating with another device for providing control information to the controller 74 to regulate the temperature remotely in a wireless manner using a known wireless technology, such as Bluetooth, NFC, Wi-Fi, Zig-Bee, or other suitable known wireless communication technology as described in further detail below.

Figure 8A:
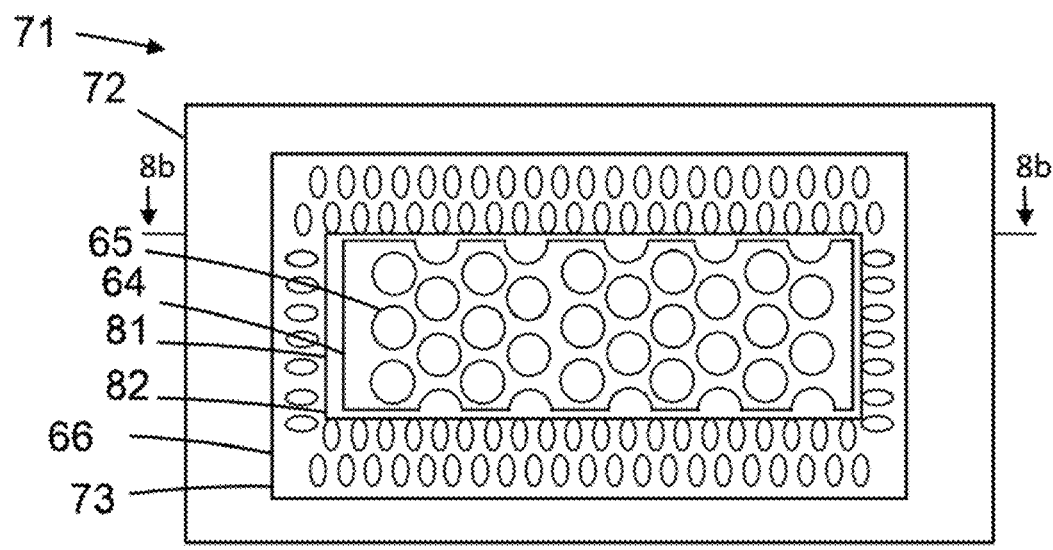
FIG. 8a is top view of a heating assembly having a composite article described herein.
Figure 8B:
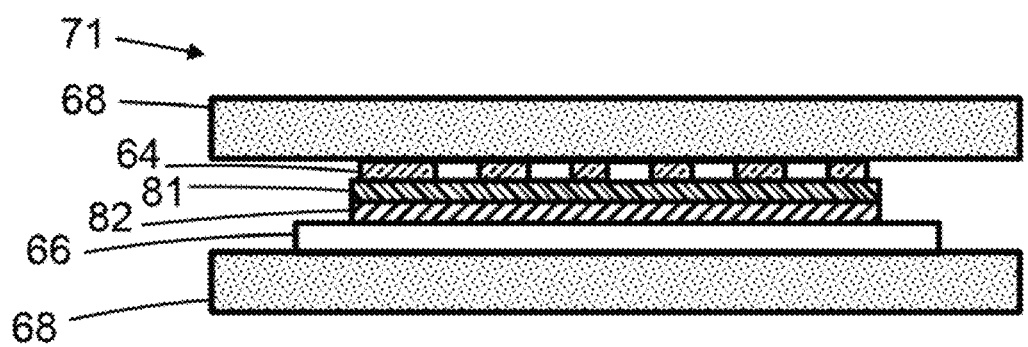
Figure 8C:
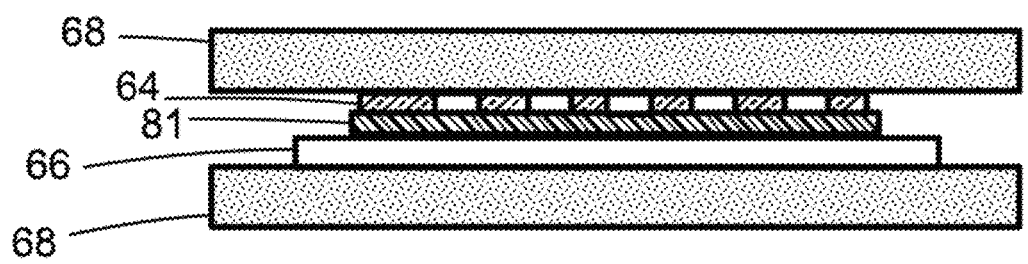

Referring now to FIGS. 8a, 8b, and 8c a heated garment 71 includes another example of a composite article 72 used as a heating assembly 73. The composite article 72 includes the heating element 64 having the cutouts 65 described above. The composite article 72 also includes a thermal interface material (TIM) 81 disposed in a adjacent alignment with the heating element 64. In one example, the TIM 81 may a flexible graphite material, such as a sheet of compressed particles of exfoliated graphite or a sheet of graphitized polymer. In one example, the TIM 81 may be eGRAF® HITHERM™ thermal interface material sold by GrafTech International Holdings Inc. which is designed for use in applications requiring low contact resistance and high thermal conductivity. The flexible graphite forming, the TIM 81 can be die-cut and/or laminated with plastics and adhesives disposed on one or both major surfaces of the TIM sheet 81. In one non-limiting example, shown in FIG. 8b, a layer of adhesive-plastic-adhesive (APA) material 82 may be disposed in adjacent alignment with the TIM material 81. The APA material 82 can include a plastic, such as for example Polyethylene terephthalate (PET). Mylar® polyethylene terephthalate Kapton® polyimide or other suitable plastics, having adhesive on both major surfaces of the APA material 82. The APA material 82 can be disposed in adjacent alignment with the graphite sheet 66 discussed above. The APA material 82 and TIM material 81 are preferably larger in surface area than the surface area defined by the outer perimeter of the heating element 64, having surface areas at least 5% greater than the surface area of the heating element, and more preferably having surface areas at least 10% greater. Referring to FIG. 8c, the APA material 82 is not used, and the TIM material 81 is disposed in adjacent alignment with the heater element 64 and the graphite sheet 66 discussed above.

Figure 9A:
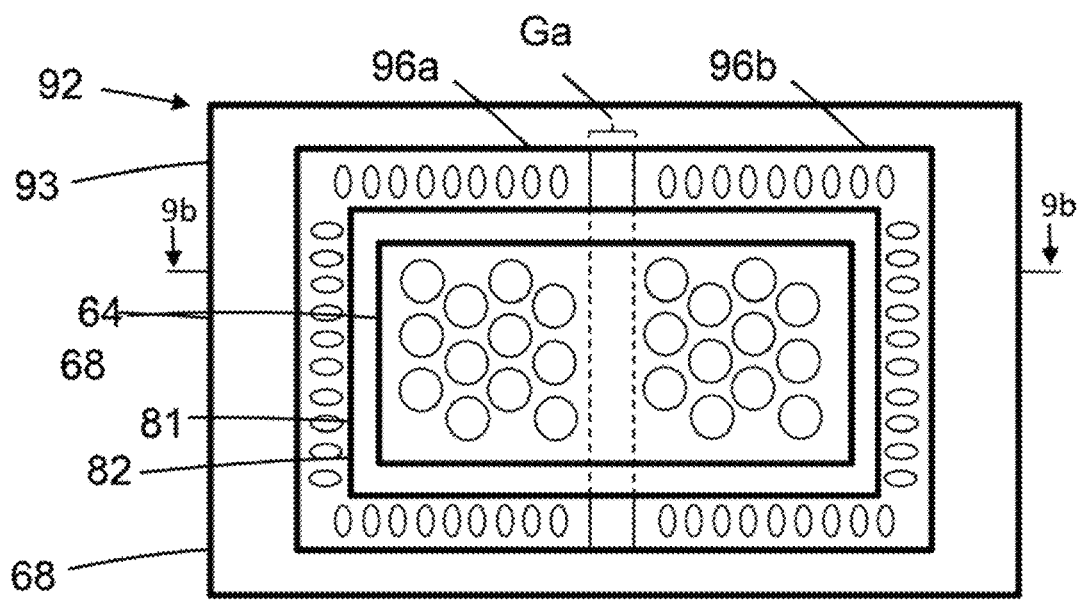
FIG. 9a is top view of a heating assembly having a composite article described herein.
Figure 9B:
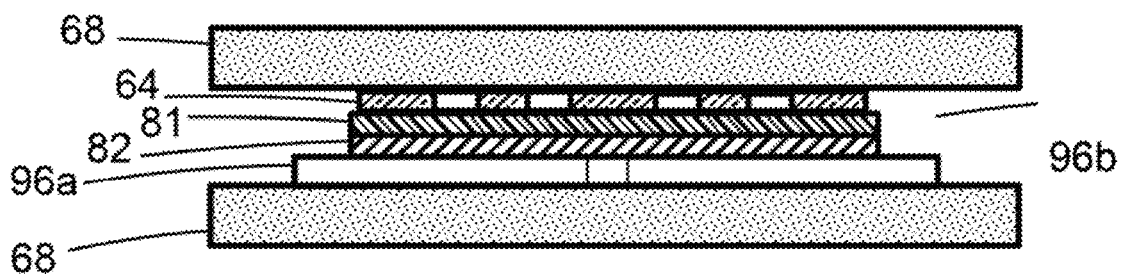
Figure 9C:
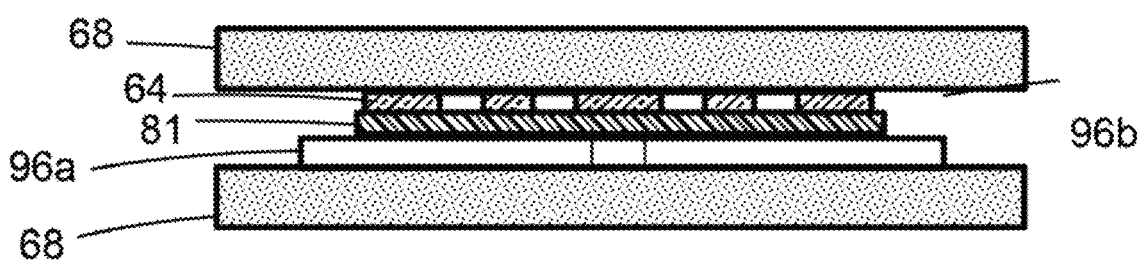

Referring now to FIGS. 9a and 9b another example of a composite article used as a garment heating assembly 93 is shown, generally at 92. The composite article 92 includes the heating element 6A discussed above. The composite article 92 also, includes a pair of spaced apart graphite sheets 96a and 96b similar to the single graphite sheet 66 discussed above. The pair of graphite sheets 96a and 96b are arranged in a co-layer configuration thereby forming a heat spreader layer which can be a different layer than the other layers formed by the components. The graphite sheets 96a and 96b are spaced apart to form an electrically insulative gap Ga there between. The composite article 92 can also include the thermal interface material (TIM) 81, described above, disposed in an adjacent alignment with the heating element 64 and the APA material 82, discussed above, disposed in adjacent alignment with the graphite sheets 96a, 96b and the TIM material 81 as shown in FIGS. 9a and 9b. Referring to FIG. 9c, the APA material 82 is not used, and the TIM material 81 is disposed in adjacent alignment with the heater element 64 and the graphite sheets 96a, 96b.

Figure 10A:
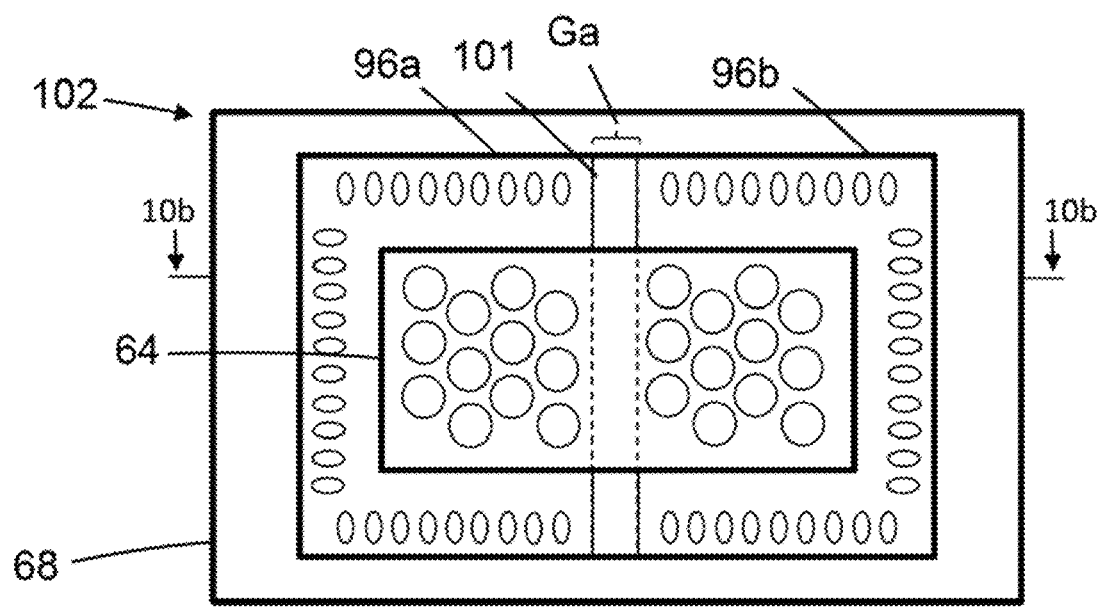
FIG. 10a is top view of a heating assembly having a composite article described herein.
Figure 10B:
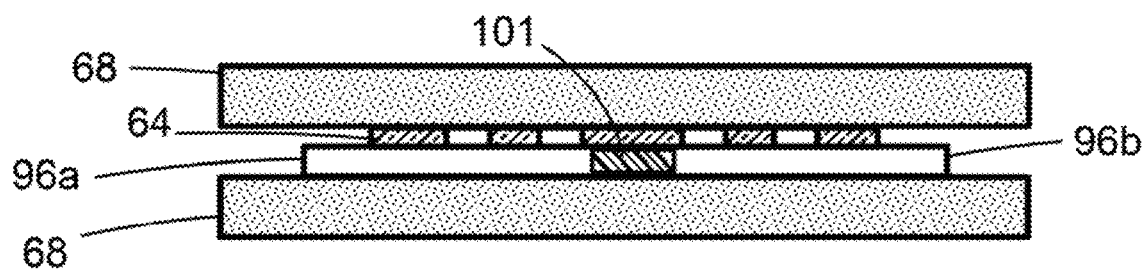
Figure 10C:
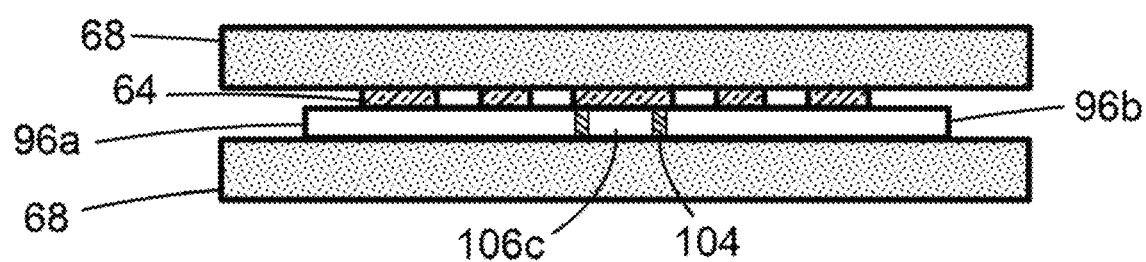

Referring now to FIGS. 10a and 10b another example of a composite article used as a garment heating assembly is shown generally at 102. The composite article 102 includes the heating element 64 discussed above. The composite article 102 also includes a pair of spaced apart graphite sheets 96a and 96b of similar construction and arrangement to those described above. Optionally, an electrical insulator or tape 104 is placed in the gap Ga between the spaced apart graphite sheets 96a and 96b. Referring to FIG. 10c the composite article includes a third graphite sheet 106c disposed in the gap Ga shown above to improve the heat spreading capability at the electrically insulating electrical tape to reduce hot spotting at that location. This sheet 106c is smaller than gap Ga and is centered within gap Ga. Electrical insulators 104, which may be tapes or paste, are inserted into the gaps between the graphite sheets.

Figure 11:
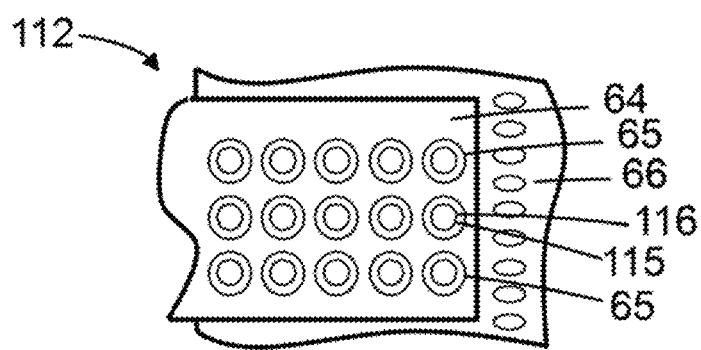
FIG. 11 is top view of a heating assembly having a composite article described herein.

Referring now to FIG. 11 another example of a composite article used as a garment heating assembly is shown generally at 112. The article includes the heating element 64 having cut outs 65 discussed above. The composite article 112 also includes a graphite sheet similar to the graphite, sheet 66 discussed above in adjacent alignment with the heating element 64. The graphite sheet 66 includes cutouts 115 which include cut out walls 116 extending between each oppositely disposed major surface of the graphite sheet. The cut outs 115 are aligned with the cutouts 65 of the heating element 64 such that the cut out walls 116 do not contact the heating element material 64. In one non-limiting example, the cut outs 115 have a similar shape as the heating element cut outs 65 only they are smaller thereby preventing the cut out walls 116 from crossing and contacting the heating element material 64. Example configurations which minimize the potential of the graphite to create an electrical short circuit with the heating element are beneficial.

Figure 12:
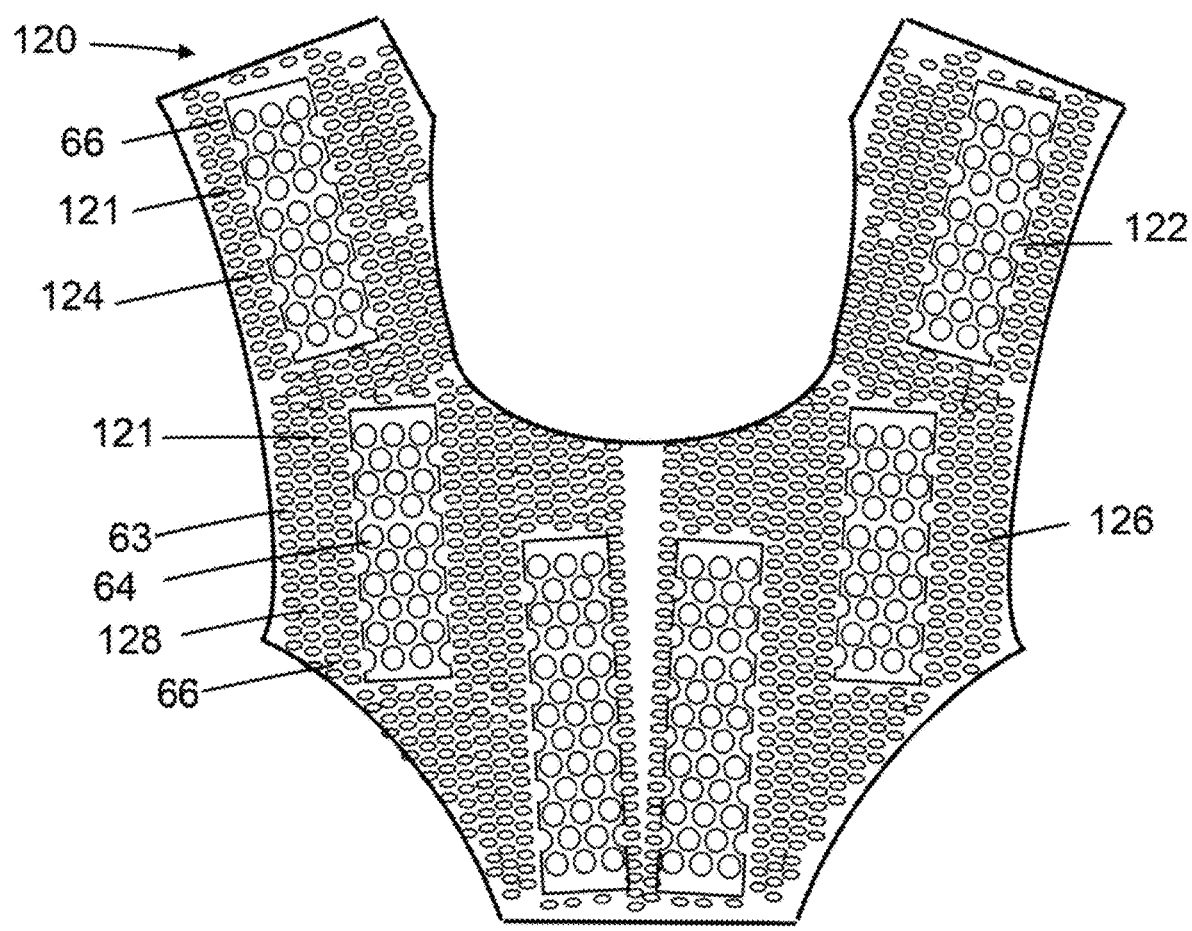
FIG. 12 is top view of a heated jacket pattern having heat assemblies formed of composite articles described herein.

Referring now to FIG. 12 a heated garment pattern for a heated jacket is shown generally at 120. The heated jacket pattern includes a plurality composite articles 121 similar to those described above each forming a heating assemblies as discussed above. The heating assemblies are custom fit to the shape of different respective portions of the heated jacket pattern as shown. The heating assemblies include a front right heating assembly 122 and front left heating assembly 124, a rear right heating assembly 126 and a rear left heating assembly 128. As discussed above, a heating assembly includes one or more heating elements 64 having cut outs 65 as discussed above or the heating element may include a wire matrix, discrete heating wires, one or more Peltier devices, fine grid of wires, printed flexible circuits on a plastic matrix material, printed carbon ink circuits on a plastic matrix, material, silver trace printed on polyester matrix, printed heaters, series of discrete carbon patches, the Li-ion battery park, itself that heats up as it discharges electricity. Each composite article also includes a graphite heat spreader in the form of a graphite sheet having cut outs. The heating elements are in adjacent alignment with the graphite sheets. The graphite sheets include the reinforcement layer and/or protective layer(s) discussed above. The graphite sheets do not include cutouts at the locations of the heating elements.

Figures 13A, 13B:
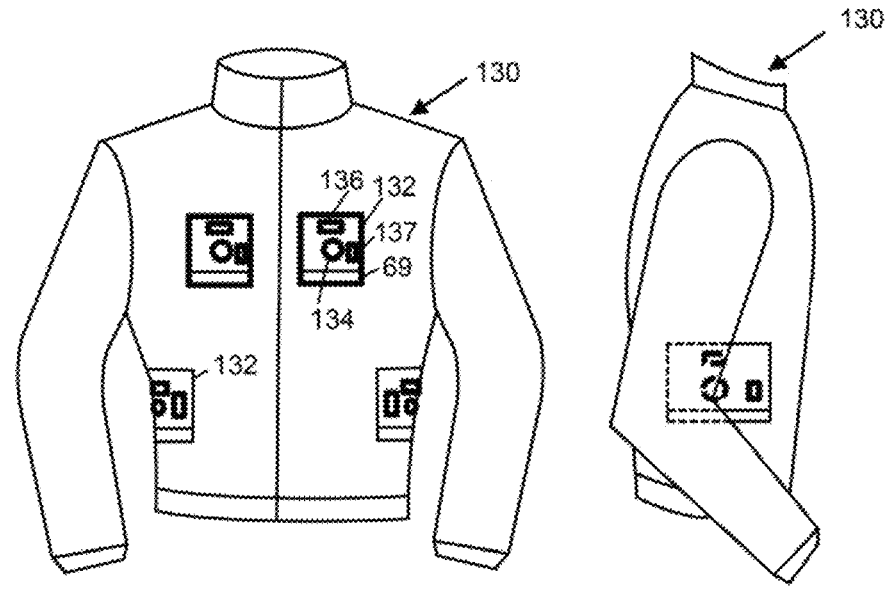
FIG. 13a is front view of a heated jacket having a remote charging assembly.
FIG. 13b is side view of a heated jacket having a remote charging assembly.
Figure 13C:
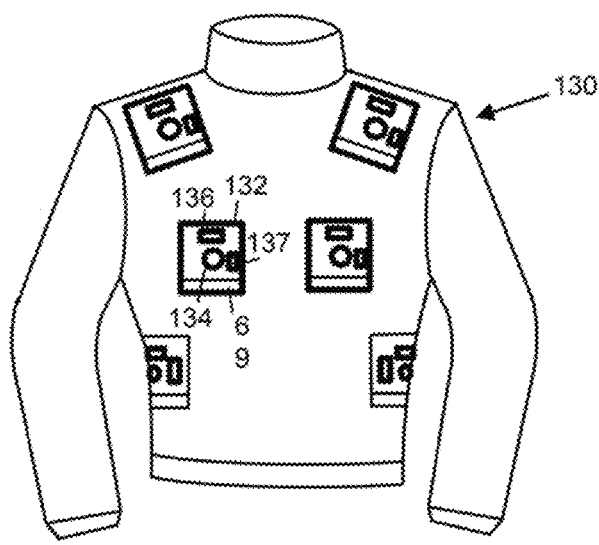
FIG. 13c is rear view (via heated jacket having a remote charging assembly.

Referring now to FIGS. 13a, 13b and 13c a heated garment in the form of a heated jacket is shown generally at 130. The heated jacket includes a plurality of heating assemblies 132 each including a heating element 64 and graphite sheet 66 similar to those discussed above. The heating assemblies further include a remote charging assembly 134 disposed at each heating assembly 132. Each remote charging assembly 134 includes a coil which is electrically activated to inductively couple with a respective coil in a charging base to remotely charge the battery 69 as described in further detail below. Each remote charging assembly 134 can also include one or more magnets 136 to attract respective magnets on the base charger to physically closely couple the coil 134 in the garment with the coil in the charging base. Each remote charging assembly 134 can also include a transmitter/receiver 137 for communicating charging instructions with appropriate transmitter/receivers in the charging station as described below. The remote charging assemblies 134 can be distributed so as to be co-located at the heating assemblies 132 together with distributed batteries 69 thereby reducing the wiring. Alternatively, one or a few centralized remote charging assemblies 134 can be used.

Figure 14A:
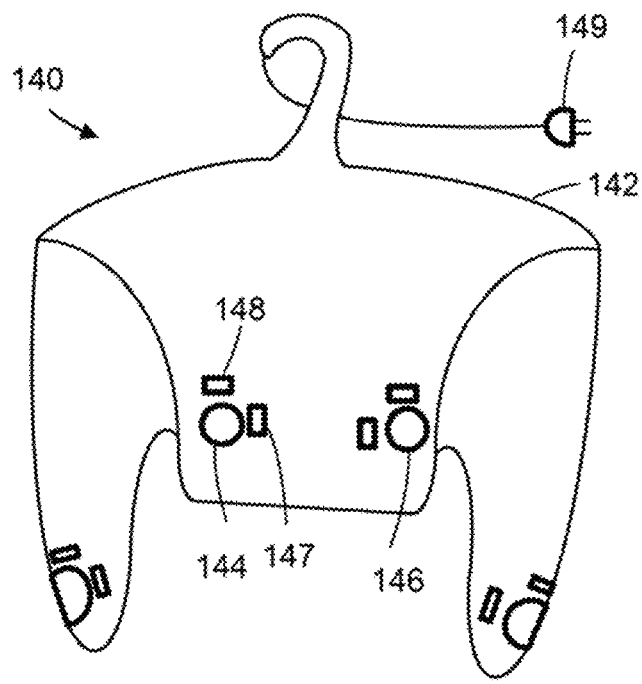
FIG. 14a is front view of a remote charging station in the form of a hanger.
Figure 14B:
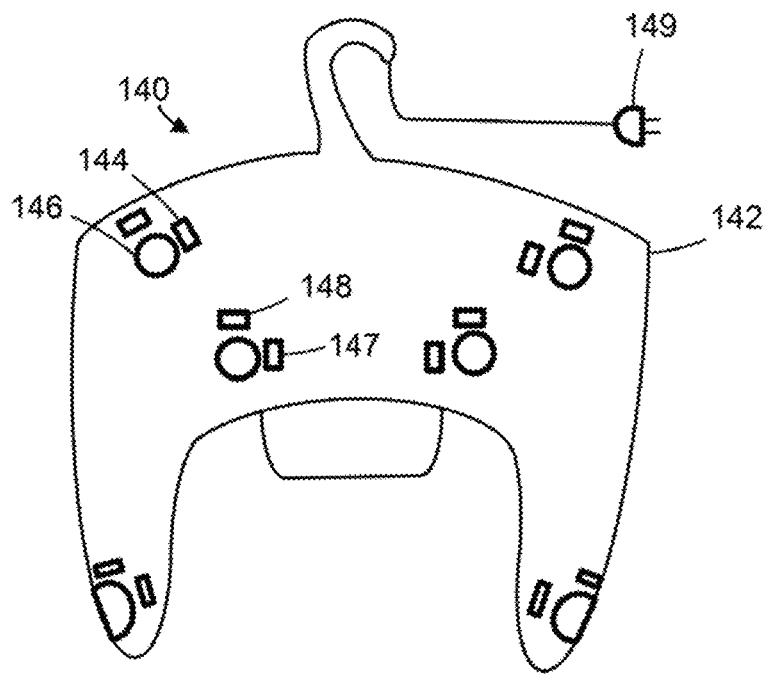
FIG. 14b is rear view of a remote charging station in the form of a hanger

Referring now to FIGS. 14a and 14b, a remote charging base 140 can be incorporated into a hanger 142. The hanger 142 includes charging stations 144 each including a coil 146 for inductively coupling with the coil 134 of the jacket 130. The charging stations 144 also include transmitter/receivers 147 for communicating wireless charging instructions to the charging base. The charging stations 144 on the hanger 142 are located in positions at which the charging assemblies 134 of the jacket are located when the jacket is placed on the hang 142. The charging stations 144 can also include one or more magnets 148 for attracting the magnets 136 of the charging assemblies 134 in the jacket to closely couple the coils for effective remote charging. The hanger 142 includes a cord and outlet plug 149 which can, be inserted into a household electrical outlet to power the charging stations 144 of the hanger 142.

In another embodiment, the magnets of the charging system may form part electrical connection. Such an embodiment is suitable of wire based charging system. In this system, the charging unit is wired into an electrical source and the current flows through the magnet in a base unit and into magnets in hanger 142 as described above, thereby charging the power system included in the garment. In this embodiment, the magnets are a source of direct contact for the current path. Stated another way, the magnets are used to create both a mechanical and electrical connection between the power source for the garment and the electricity supply e.g., 120V outlet.

Figures 15A, 15B:
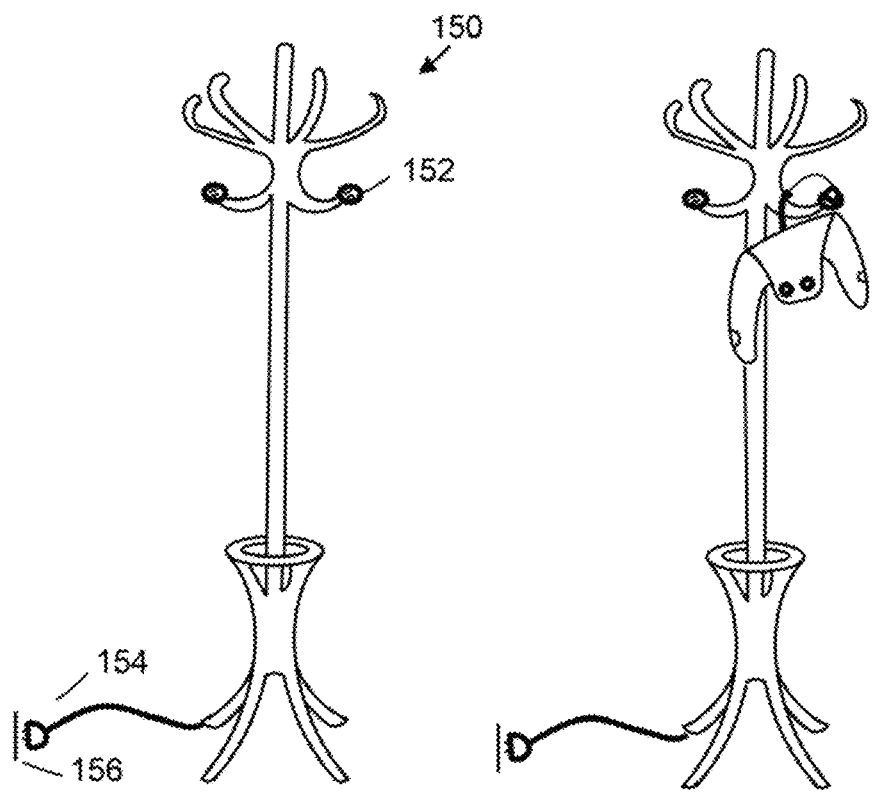
FIG. 15a is view of a powered coat rack for powering a remote charging station.
FIG. 15b is view of a powered coat rack and a remote charging station in the form of a hanger.

Referring now to FIGS. 15a and 15b a coat rack 150 is shown having an electrical outlet 152 for receiving the charging station hanger plug 149 thereby providing power to the hanger 142. The coat rack 150 also includes an electrical cord and plug 154 which is plugged into a household electrical outlet 156 to provide power to the outlet 152.

Figure 16A:
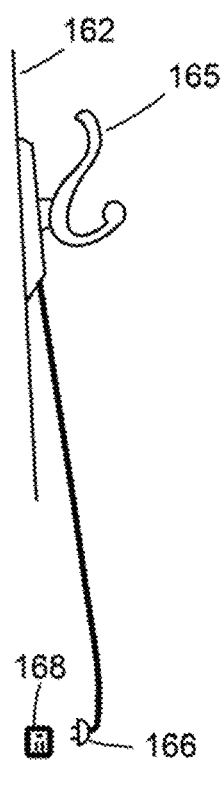
FIG. 16a is view of a powered coat rack for powering a remote charging station.
Figure 16B:
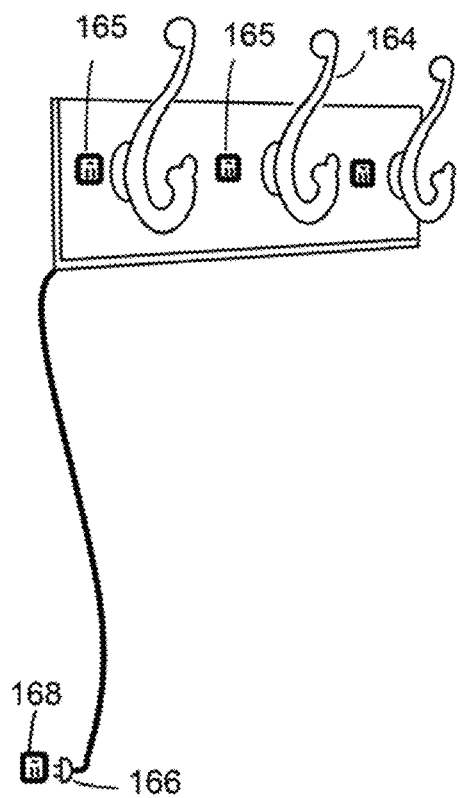
FIG. 16b is view of a powered coat rack and a remote charging station in the form of a hanger.

Referring stow to FIGS. 16a and 16b a coat rack can 160 is shown which can be mounted to a wall 162. The coat rack includes hooks 164 for hanging one or more heated garments. The hooks 164 can receive hangers 142 similar to the hangers described above for power the remote charging station(s) in the hanger in a manner as described above. The coat rack 160 also includes one or more electrical outlets 165 for providing power to the hangers 142 discussed above. The coat rack 160 also includes an electrical cord and plug 166 which is plugged into a household electrical outlet 168 to provide power to the outlet 152.

The heated garment using the heating assemblies having composite article which includes a graphite heat spreader as described herein have several advantages over a comparable conventional heated garment which does not use a compos article. The new heated garment may heat up three (3×) times faster than a conventional heated garment or more, and it has a heat gradient that is 15 times lower. The heat gradient for the new heated garment is about 3° F. compared to about 45° F. for the conventional heated garment. Also hot spots are virtually eliminated, particularly hot spots that are generated in narrow portions of the heating element between adjacent cut outs 65. The new heated garment can be easily recharged via remote charging. It also uses multiple smaller and/or thinner distributed batteries, thereby improving comfort to the user.

With respect to heated seats, the afore noted spreaders may be located between the seating surface of the seat and the heating element, the spreader may be located below the heating element, therefore opposed to the seating surface, or both above and below the heating element. In the case of the heat spreader located above and below the heating element, one or more than one heat spreader may be used. Likewise, in the case of a heat spreader above or below the heating element, such heat spreader may be composed of one (1) or a plurality of sheets. In the ease of a plurality of sheets, the sheets may have the same thickness, different thickness, or any combination thereof. Further, the various sheets may not overlap or may overlap by any desired amount. Lastly, with respect to a plurality of sheets disposed on one side of a heating element, the sheets may be located apart from each other by any desired geometry. The spreaders may also be made up of multiple panels a plurality of strips of compressed particle of exfoliated graphite, graphitized polymer or combinations thereof, woven together (woven composite article).

In the case that the heat spreader or heat spreaders are located on both sides of the heating element, the heat spreaders may have the same or differing thicknesses, compositions and/or structures.

If the spreader is only located above the heating element relative to the seating surface of the seat, the embodiment may also include an insulation material disposed under the heating element. Preferably, but not limited to, the insulation material is disposed adjacent the heating element.

For embodiments which include more than one (1) spreader, the spreaders may be attached in the seat such that the spreaders may be able to move relative to each other and/or the heating element. One example of this is that the spreader is only attached to an edge portion of the seat. Other embodiments of attachment are equally applicable. For a spreader that comprises multiple pieces of graphite (AKA the spreader comprises segments), the various pieces of graphite may be able to move relative to one another as well as the heat spreader. Any desired orientation of freedom is applicable. For example, each respective piece of graphite may be affixed to a different edge section of the seat than the other piece of graphite. Another example may be that one or more of the pieces of graphite may be free to move in the seat.

The above seat embodiments may include one or more foam cushions, in the seating area for the comfort of the user. The foam may be located in any orientation to the heat spreaders and heating element. For example, the foam may be located above or below the heating elements and the spreader assembly. Conversely, the heating element—heat spreader assembly may be horizontally located in between two (2) foam sections or the assembly may be located in an interior of the foam.

In a preferred embodiment, the spreader heating element assembly will pass General Motors GMW 14373, titled Seat Heater Load Durability Test. Such test is incorporated herein by reference in its entirety. Another preferred advantage of embodiments is that the resistance in the heating element does not increase by more than twenty (20%) percent after the seat under goes GMW 14373, preferably not more than fifteen (15%) percent, even further preferred not more than ten (10%) percent.

Particular embodiments of the heater element—spreader assembly are oriented in the seat, such that the heating element is not located in the center of the seating area of the seat. In these embodiments, the spreader may be used to spread heat horizontally into the center of the seating area.

Conversely, if so desired the heating element may be located at least the center of the seating area of the seat. Preferably, in these embodiments, the spreader is located at least above the heating element. Therefore, the spreader would be located horizontally closer to the seating surface than the heating element.

The one or more embodiments disclosed herein when applied to a seat may be used to heat or cool the seat to a user desired temperature within two (2) minutes or less, preferably one (1) minute or less, even more preferably forty (40) seconds or less and most preferred twenty (20) seconds or less.

With respect to hot spots, the same and similar embodiments may be used to reduce temperature hot spots by more than twenty (20%) percent, preferably at least twenty-five (25%) percent and even further at least thirty (30%).

Furthermore, these embodiments of the seat may exhibit an improvement in temperature uniformity be at last twenty-five (25%) percent, preferably at least forty (40%) percent and further preferred up to fifty (50%) percent or more. These embodiments have also exhibited advantageous flexibility and durability.

In the case of medical or therapeutic pads, the heat spreader may be the article adjacent the user. The surface of the heat spreader adjacent the user, may be one of an adhesive suitable for use on a patient followed by at least one of the protective coating, the reinforcement of the graphite material. The heating element is preferably disposed opposite the user on the heat spreader. Preferably, the heating element may be reusable.

Advantages of the embodiments disclosed herein with respect to an article of clothing may include ono or more of the following: (1) the warmth of a bulky article of clothing; (2) movability; (3) heat to full power at least twice (2×) as fast as current product offerings, preferably at least four (4×) as current embodiments and more preferably at least five (5×) times as fast, e.g., five and a half (5.5) minutes as compared to twenty-eight (28) minutes.

Another advantage of the various embodiments disclosed herein, may be when applied to clothing, an improvement in the efficiency of the system such that required energy storage requirements of the system are reduced by at least twenty-five (25%) percent, preferably at least thirty-five (35%) percent and even more preferably more than fifty (50%) percent.

A further advantage of the system when applied to heated clothing is a reduction in temperature gradients. Current heated garments can exhibit temperature gradients of about forty-five degrees Fahrenheit (45° F.), whereas embodiments disclosed herein may have a temperature gradient of less than about twenty degrees Fahrenheit (20° F.), preferably less than about ten degrees Fahrenheit (10° F.) and even more preferably less than about five degrees Fahrenheit (5° F.).

The various embodiments described herein can be practiced in any combination thereof. The above description is intended to enable the person skilled in the art to practice the invention. It is not intended to detail all of the possible variations and modifications that will become apparent to the skilled worker upon reading the description. It is intended, however, that all such modifications and variations be included within the scope of the invention that is defined by the following claims. The claims are intended to cover the indicated elements and steps in any arrangement or sequence that is effective to meet the objectives intended for the invention, unless the context specifically indicates the contrary.

What is claimed is:

1. A composite article comprising:
   a sheet of one of compressed particles of exfoliated graphite and graphitized polymer, the sheet having a first surface and a second surface;
   a protective coating aligned with the first surface of the sheet; and
   a reinforcement layer including at least one of a fiber reinforced polymer, a fiber weave, a synthetic polymer, a fiber mat and combinations thereof aligned with at least one of the first surface of the sheet and the second surface of the sheet;
   wherein the composite article has a stretchability of at least 5% elongation in at least a first direction.

2. The composite article of claim 1 further comprising stitching through at least a majority of the sheet.

3. The composite article of claim 1 wherein the sheet further comprises a plurality of cut outs.

4. The composite article of claim 3 wherein a shape of the cut outs comprises circular, rectangular, diamond-shaped, rhombus-shaped, ellipsoid, teardrop, elliptical, hexagonal, octagonal, chevron, perforations and combinations thereof.

5. The composite article of claim 1 further comprising one of a plurality slits and a plurality of predetermined perforations.

6. The composite article of claim 1 further comprising a heating element in thermal communication with the sheet.

7. The composite article of claim 6 further comprising a user interface surface, wherein the heating element is located adjacent the user interface surface and the sheet is located adjacent the heating element opposed to the user interface surface.

8. A composite article comprising: a plurality of strips of one of compressed particles of exfoliated graphite, graphitized polymer and combinations thereof, wherein the strips are woven together and at least half of the strips have a first surface and a second surface and at least one of a fiber reinforced polymer, fiber weave, synthetic polymer and fiber mat aligned with at least one of the first surface and the second surface, wherein the composite article has a stretchability of at least 5% elongation in at least a first direction.

9. The composite article of claim 8 having a protective coating aligned with the second surface of each strip.

10. The composite article of claim 8 having an open weave.

11. The composite article of claim 10 wherein the open weave includes an opening comprising at least one of the followings shapes: circular, rectangular, diamond shaped, rhombus-shaped, ellipsoid, teardrop, elliptical, ellipsoid, triangular, hexagonal, octagonal and chevron.

12. The composite article of claim 8 wherein at least a majority of strips include a stitching.

13. The composite article of claim 8 incorporated into one of a jacket lining, a vehicle seat, vehicle seat cover, an outdoor furniture seat, an indoor furniture seat, furniture seat covers, a mattress, medical pads, a pair of pants, undergarments, a glove, a helmet, a vest, blankets, scarves, hats, hoods, blanket, therapeutic pad, animal accessories or a shirt.

14. The composite article of claim 8 further comprising one of a plurality of slits and a plurality of predetermined perforations.

15. A garment comprising:
    a fabric outer layer;

an interior layer;

a heating element disposed between the fabric outer layer and the interior layer; and a composite article disposed between the heating element and the outer layer, the composite article including:

graphite including at least one sheet of at least one of compressed exfoliated graphite and graphitized polymer, and a fiber reinforcement layer including at least one of a fiber reinforced polymer, a fiber weave, a synthetic polymer, a fiber mat and combinations thereof aligned with at least one surface of the graphite, wherein the composite article has a stretchability of at least 5% elongation in at least a first direction.

16. The garment of claim 1 wherein the protective coating comprises plastic.

17. The composite article of claim 8 further comprising a heating element in thermal communication with the plurality of strips.

18. The composite article of claim 9 wherein the protective coating comprises plastic.

19. The garment of claim 15 wherein the at least one sheet includes a first surface and further comprising a protective coating aligned with the first surface.

20. The garment of claim 19 wherein the protective coating comprises plastic.

\* \* \* \* \*